(12) United States Patent
Kim et al.

(10) Patent No.: US 11,389,829 B2
(45) Date of Patent: Jul. 19, 2022

(54) METHOD OF PRODUCING SUPERHYDROPHOBIC COATING FILM COATED WITH AEROGEL NANOCOMPOSITE

(71) Applicant: KOREA INSTITUTE OF SCIENCE AND TECHNOLOGY, Seoul (KR)

(72) Inventors: Sang Woo Kim, Seoul (KR); Seong Jun Kim, Seoul (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 103 days.

(21) Appl. No.: 16/805,842

(22) Filed: Mar. 2, 2020

(65) Prior Publication Data
US 2021/0170443 A1 Jun. 10, 2021

(30) Foreign Application Priority Data
Dec. 10, 2019 (KR) .................. 10-2019-0163806

(51) Int. Cl.
*B05D 5/08* (2006.01)
*B05D 3/00* (2006.01)
*B05D 7/00* (2006.01)
*C01B 33/158* (2006.01)
*B05D 1/28* (2006.01)
(Continued)

(52) U.S. Cl.
CPC ............... *B05D 5/08* (2013.01); *B05D 3/002* (2013.01); *B05D 3/007* (2013.01); *B05D 7/52* (2013.01); *C01B 33/1585* (2013.01); *B05D 1/005* (2013.01); *B05D 1/02* (2013.01); *B05D 1/18* (2013.01); *B05D 1/28* (2013.01)

(58) Field of Classification Search
CPC .......... B05D 5/08; B05D 3/002; B05D 3/007; B05D 7/52; B05D 1/005; B05D 1/02
See application file for complete search history.

(56) References Cited

U.S. PATENT DOCUMENTS

2011/0206925 A1* 8/2011 Kissel .................. D06N 3/0063
428/319.1
2014/0134907 A1 5/2014 Kissel et al.
(Continued)

FOREIGN PATENT DOCUMENTS

JP WO2017/038649 A1 3/2017
KR 10-2011-0042267 A 4/2011
(Continued)

OTHER PUBLICATIONS

Korean Office Action for KR Application No. 10-2019-0163806 dated Aug. 17, 2021.

*Primary Examiner* — Nathan T Leong
(74) *Attorney, Agent, or Firm* — Cantor Colburn LLP

(57) ABSTRACT

The present invention relates to a superhydrophobic coating film in which an aerogel nanocomposite is coated on a substrate to maximize water-repellent properties and durability, and a producing method thereof. According to one embodiment of the present invention, the method of producing the superhydrophobic coating film using the aerogel nanocomposite includes (a) preparing a hydrophobic aerogel, (b) preparing a water-repellent solution by dissolving the hydrophobic aerogel in a hydrophobic inorganic nanosol, (c) applying the water-repellent solution on at least one surface of a substrate, and (d) drying the substrate.

20 Claims, 30 Drawing Sheets

(51) Int. Cl.
    *B05D 1/00*    (2006.01)
    *B05D 1/02*    (2006.01)
    *B05D 1/18*    (2006.01)

(56) References Cited

U.S. PATENT DOCUMENTS

2016/0130449 A1    5/2016   Kissel et al.
2018/0134566 A1*   5/2018   Kim ..................... B01J 13/0091
2018/0327609 A1*   11/2018  Makino ..................... B32B 5/18

FOREIGN PATENT DOCUMENTS

KR          101909174       * 10/2018
KR          10-1964894 B1     4/2019

* cited by examiner

R : epoxy group
R : alkyl group

METHOD OF PRODUCING SUPERHYDROPHOBIC COATING FILM COATED WITH AEROGEL NANOCOMPOSITE

CROSS-REFERENCE TO RELATED APPLICATION(S)

This application claims the benefit under 35 USC § 119(a) of Korean Patent Application No. 10-2019-0163806, filed on Dec. 10, 2019, in the Korean Intellectual Property Office, the entire disclosure of which is incorporated herein by reference for all purposes.

BACKGROUND

1. Field

The following description relates to a superhydrophobic coating film and producing method thereof, and more specifically, to a coating film in which a substrate is coated with an aerogel nanocomposite to maximize high water-repellent properties, water repellency persistency, and durability, and a producing method thereof.

2. Description of Related Art

A superhydrophobic surface refers to a surface whose contact angle, which represents the wettability with water droplets, is 150° or greater. The superhydrophobic surface allows water droplets to flow down at even small inclination, thereby achieving characteristics, such as self-cleaning, flame retardant/non-flammable, anti-corrosion, anti-icing/fogging, and the like, and hence is drawing attention in many key industries.

The surface of every material has its own surface energy, which determines hydrophobicity of the surface. Methods for improving contact angle by controlling a water-repellent surface include a chemical method and a method of controlling a surface roughness. According to the chemical method, a superhydrophobic performance is imparted by coating a surface with a low surface energy material such as fluorine. There is a limitation in forming a superhydrophobic surface only with the chemical method that adds a low surface energy. For this reason, a method of controlling surface energy by imparting roughness in micro-nano scale is used. As a method of controlling the surface roughness, micro-nano sized fine bump structures are formed on a surface to increase the roughness so that a large amount of air is trapped between the surface and water droplets, thereby increasing the contact angle.

Conventionally, a method of forming micro-nano fine structures by physicochemical methods, such as lithography, chemical vapor deposition, etching, plasma treatment, and the like, or a method of growing or synthesizing, on a flat substrate, nano- or micro-particles consisting of silica, titania, alumina, and the like is used to increase the surface roughness. However, the conventional methods are difficult to coat a large area and to exhibit characteristics on various substrates, and moreover, the direct coating on the surface has an issue in terms of production time and cost. Also, the method of lowering the surface energy by the chemical method has limitations in that the water-repellent properties do not last for a long time and the surface treatment using expensive fluorine-based materials is not environmentally friendly.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention is directed to producing a hydrophobic aerogel nanocomposite to provide a superhydrophobic coating film which has a low surface energy and a high contact angle.

In addition, to solve the above-described conventional problems, the present invention is directed to providing a method of applying simple coating methods without using expensive fluorine-based materials to simply and quickly impart a superhydrophobic performance to a variety of substrates of a large area.

According to one general aspect of the present invention, there is provided a method of producing a superhydrophobic coating film.

The method includes (a) preparing a hydrophobic aerogel, (b) preparing a water-repellent solution by dissolving the hydrophobic aerogel in a hydrophobic inorganic nano-sol, (c) applying the water-repellent solution on at least one surface of a substrate, and (d) drying the substrate.

The step (a) may include the step of performing surface treatment to modify a surface of a hydrophilic aerogel.

The surface treatment may be performed using at least one surface treating agent selected from the group consisting of a silane group compound, a siloxane group compound, a silanol group compound, a silazane group compound, and the like.

The step (a) may include the step of drying the hydrophilic aerogel using a supercritical fluid.

The step (c) may include the steps of (c1) forming a primer layer by applying a hydrophobic inorganic nano-sol on at least one surface of the substrate and (c2) applying the water-repellent solution on a top of the primer layer.

The step (c) may be performed using one or more methods out of brush coating, spin coating, spray coating, and dip coating.

The hydrophobic inorganic nano-sol used may include a silica sol or a silica-hybrid sol.

The hydrophobic inorganic nano-sol may be one or more of methyltrimethoxysilane, methyltrichlorosilane, ethyltrimethoxysilane, ethyltriethoxysilane, phenyltrimethoxysilane), phenyltrichlorosilane, phenylaminopropyltrimethoxysilane, octyltrimethoxysilane, octyltrichlorosilane, octadecyltrimethoxysilane, octadecyltrichlorosilane, propyltrimethoxysilane, n-propyltriethoxysilane, isopropyltriethoxysilane, isobutyltrimethoxysilane, vinyltriethyloxy silane, vinyltrimethoxysilane, and allyltrimethoxysilane.

The substrate may be made of wood, glass, aluminum foil, copper plate, or polyethylene terephthalate (PET).

The method may further include, before the step (c), a step of pretreating the substrate.

The step (d) may be performed in a temperature range of 20 to 150° C. for 1 hour.

The method may further include, after the step (d), a step of removing particles that are not fixed to the surface of the substrate.

A specific surface area of the hydrophobic aerogel may be 100 to 1200 $m^2/g$.

According to another general aspect of the present invention, there is provided a superhydrophobic coating film.

The superhydrophobic coating film may be produced by the above method and may include a substrate and a water-repellent layer which is formed on at least one surface of the substrate and includes a hydrophobic aerogel and a hydrophobic inorganic nano-sol.

A contact angle of the water-repellent layer may be 100° to 160°. The contact angle of the water-repellent layer may remain in the range from 100° to 160° after being heated by flame at a temperature of 550° C. or higher.

A thickness of the water-repellent layer may be 1 to 100 µm.

The superhydrophobic coating film may further include a primer layer which is formed by curing the hydrophobic inorganic nano-sol on the at least one surface of the substrate, wherein the water-repellent layer is formed on a top of the primer layer.

Other features and aspects will be apparent from the following detailed description, the drawings, and the claims.

Figure 1A:
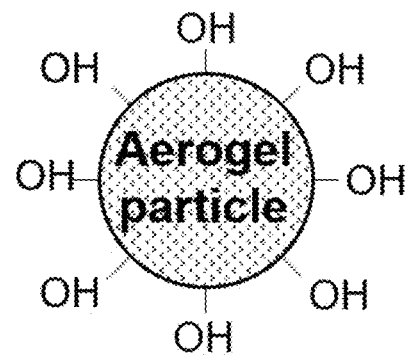
FIGS. 1A and 1B schematically illustrate hydrophilic and hydrophobic aerogel particles according to one embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed descriptions of the invention will be made with reference to the accompanying drawings illustrating specific embodiments of the invention by way of example. These embodiments will be described in detail such that the invention can be carried out by one of ordinary skill in the art. It should be understood that various embodiments of the invention are different, but are not necessarily mutually exclusive. For example, a specific shape, structure, and characteristic of an embodiment described herein may be implemented in another embodiment without departing from the scope of the invention. In addition, it should be understood that a position or placement of each component in each disclosed embodiment may be changed without departing from the scope of the invention. Accordingly, there is no intent to limit the invention to the following detailed descriptions. The scope of the invention is defined by the appended claims and encompasses all equivalents that fall within the scope of the appended claims. In the drawings, like reference numerals denote like functions, and the dimensions such as lengths, areas, and thicknesses of elements may be exaggerated for clarity.

Hereinafter, to allow one of ordinary skill in the art to easily carry out the invention, embodiments of the present invention will be described in detail with reference to the accompanying drawings.

Figure 1B:
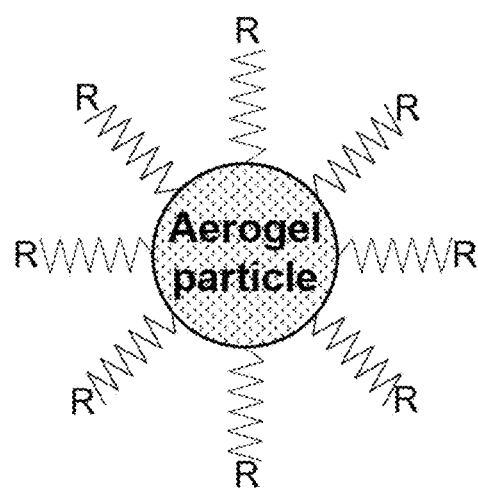

FIGS. 1A and 1B schematically illustrate preparation of hydrophobic aerogel according to one embodiment of the present invention. An aerogel is a porous solid nanostructure which has a three-dimensional network structure and is contained in a skeleton network. An aerogel usable in an embodiment of the present invention may have a high surface area (100 to 1200 m$^2$/g), a high porosity (up to 99.8%), a low density (0.003~0.35 g/cc), a low dielectric constant (less than 2.0), and a small pore size. The high porosity and surface area may enable the application as ultralight, super-insulating material, micro filter, adsorbent, material for drug release control, catalyst carrier, ultra-insulating material, or the like.

FIG. 1A shows a hydrophilic aerogel made through a drying process. Aerogels are transparent white powders with a nano-porous structure and have a chemical formula of $SiO_2 \cdot nH_2O$. In the embodiment of the present invention, the hydrophobic aerogel may be prepared by preparing a hydrophilic wet gel, followed by solvent replacement and surface modification, and then drying the result. The wet gel obtained by the above method may be dried while retaining the porous structure, and the dried aerogel may be pulverized for use.

Referring to FIG. 1B, a hydrophobic aerogel according to an embodiment of the present invention is obtained by surface treating a silanol group (Si—OH) of the hydrophilic aerogel using a surface treating agent including a hydrophobic group.

The surface treating agent may be one of an epoxy group, an alkyl group, silane, a methoxy group, an ethoxy group, a propoxy group, an isopropoxy group, and a halogen group, or a combination thereof. The surface treating agent may be at least one selected from the group consisting of a silane group compound, a siloxane group compound, a silanol group compound, a silazane group compound, and the like. This surface treatment may be carried out to transform —OH of the surface into a non-reactive group.

The hydrophobic aerogels used according to an embodiment of the present invention may be two types of hydrophobic aerogels prepared using a method of drying, under atmospheric pressure, a wet gel that has been subjected to solvent replacement and surface modification and a method of drying a wet gel using a supercritical fluid at high temperature and high pressure. Thereafter, the aerogels prepared by the above-described method may be pulverized for use.

The hydrophobic aerogel prepared through the atmospheric pressure drying has an advantage in that continuous processing is possible. Also, the hydrophobic aerogel prepared using the supercritical drying has no volume change caused by the difference in surface tension, and condensation due to a capillary action does not occur so that it is possible to obtain a high-quality hydrophobic aerogel.

In an embodiment of the present invention, in the case of a water-repellent solution containing hydrophobic aerogels prepared by atmospheric pressure drying, the content of the hydrophobic aerogel may be 5 to 17.5 wt %. In the case of a water-repellent solution including hydrophobic aerogels prepared by supercritical drying, the content of the hydrophobic aerogel may be in a range of 5 to 20 wt %, preferably, 5 to 17.5 wt %.

Figure 2:
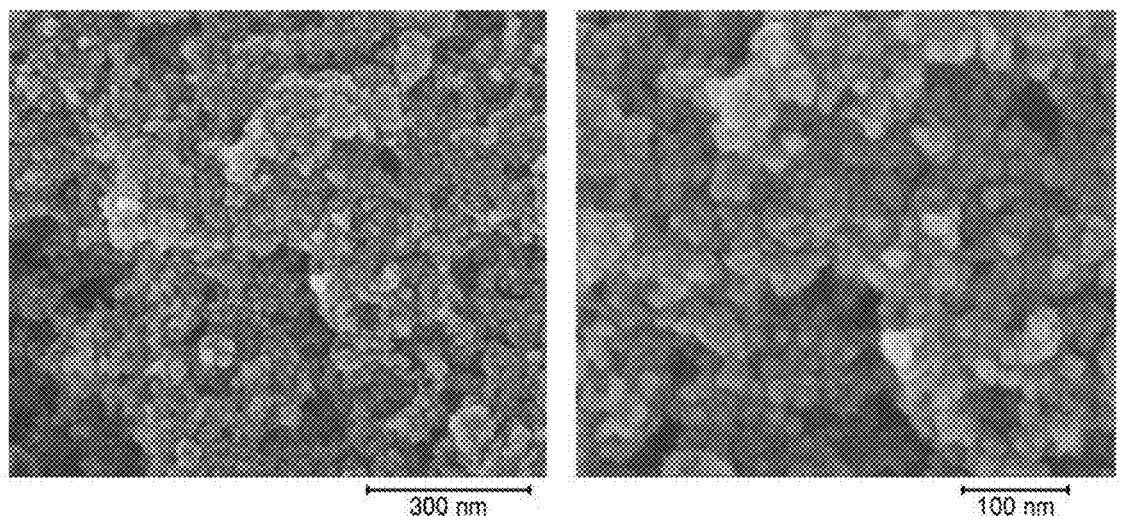
FIG. 2 shows scanning electron microscope (SEM) images of hydrophobic aerogel powders according to one embodiment of the present invention.

FIG. 2 shows scanning electron microscope (SEM) images of hydrophobic aerogel powders according to one embodiment of the present invention. Referring to FIG. 2, the average particle size of the hydrophobic aerogel is 10 to 50 nm, preferably, 20 to 30 nm. The hydrophobic aerogel has porosity of 90% or higher, specific surface area of 490 m/g$^2$ or higher, and apparent specific gravity of 0.2 g/cm$^3$ or less.

Figure 3A:
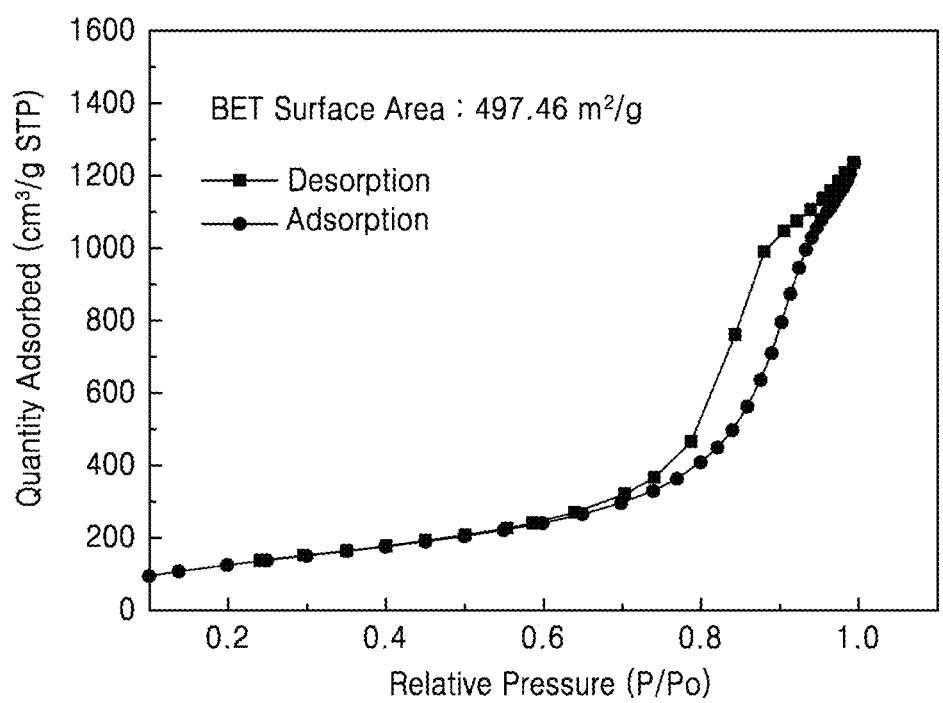
FIGS. 3A and 3B are graphs showing Brunauer-Emmett-Teller (BET) surface area measurement results according to one embodiment of the present invention.
Figure 3B:
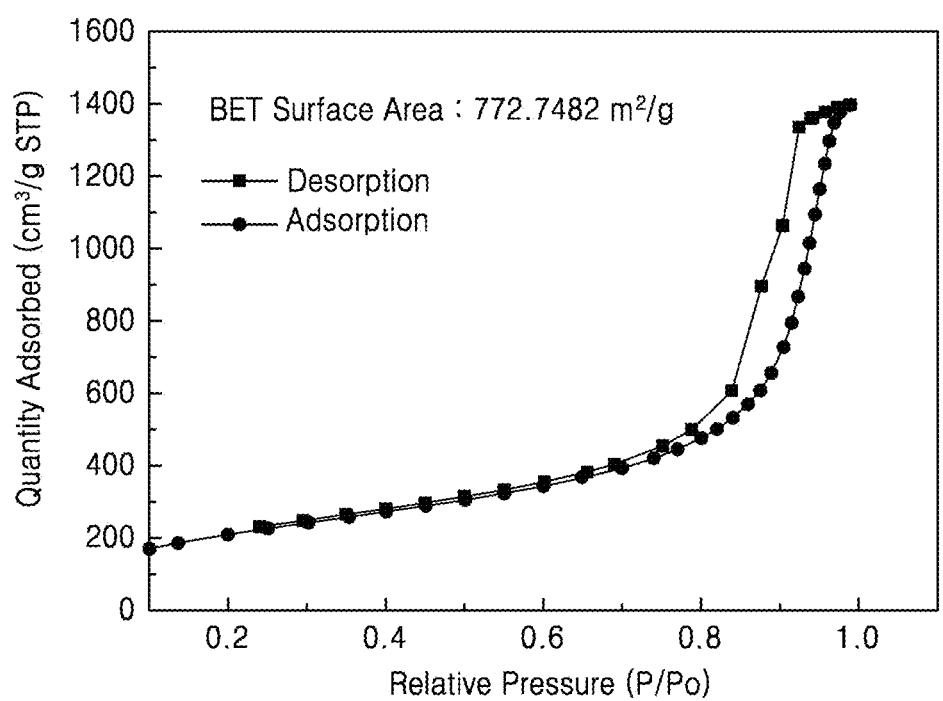

FIGS. 3A and 3B are graphs showing a Brunauer-Emmett-Teller (BET) surface area of hydrophobic aerogel due to atmospheric pressure drying and supercritical drying according to an embodiment of the present invention. The BET surface areas of the silica aerogels were measured using an automated gas sorption system; $N_2$ adsorption-desorption isotherms were obtained at 77 K. The pore diameters and volumes were calculated using the Barrett-Joyner-Halenda (BJH) method. Referring to FIG. 3A, hydrophobic aerogel powders prepared by atmospheric pressure drying after solvent replacement and surface modification have BET surface area of 497 m/g$^2$. Referring to FIG. 3B, hydrophobic aerogel powders prepared by supercritical drying have BET surface area of 773 m/g$^2$. Based on the foregoing it is possible to determine the ratio and content of hydrophobic aerogel and hydrophobic inorganic nano-sol in preparing a water-repellent solution. FIGS. 3A and 3B show the adsorption and desorption hysteresis loop of $N_2$ measured in terms of BET surface area to determine the structural characteristics of silica aerogel particles. The silica aerogel powders prepared by the two methods show Type IV hysteresis loops which means the silica aerosol powders have typical mesopores. In the low-pressure section, $N_2$ gas adsorption occurs in macropores and no hysteresis due to $N_2$ adsorption and desorption occurs. As the pressure increases, however, capillary forces develop and hysteresis loops occur. This is because the adsorbed $N_2$ gas is not easily desorbed due to the capillary phenomenon of mesopores, resulting in hysteresis curves as shown in FIGS. 3A and 3B. It is shown that aerogels having mesopores were made in both samples.

Figure 4A:
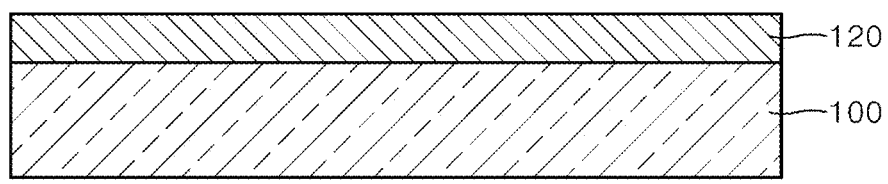
FIGS. 4A and 4B illustrate cross-sectional views of a superhydrophobic coating film using an aerogel nanocomposite according to one embodiment of the present invention.
Figure 4B:
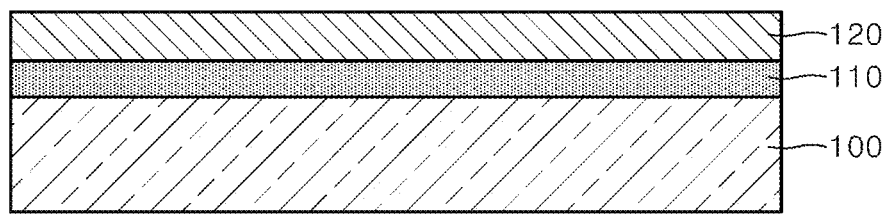

FIGS. 4A and 4B illustrate cross-sectional views of a superhydrophobic coating film using an aerogel nanocomposite according to one embodiment of the present invention. FIG. 4A illustrates a substrate 100 and a water-repellent layer 120 coated on the substrate 100. The coated water-repellent layer 120 may be preferably used for paint and a coating agent for antifogging, flame retardance, and waterproof, but is not limited thereto.

The substrate 100 may be made of wood, glass, aluminum foil, copper plate, polyethylene terephthalate (PET), or the like, and a pretreatment process for removing foreign substances may be additionally performed according to the type of the substrate. In an embodiment of the present invention, the pretreatment process may be performed in which the substrate is washed in ethanol for 10 minutes using an ultrasonication bath and dried at 60° C. for 1 to 6 hours.

In addition, the substrate 100 may be flat or have a shape with a rough surface, and is not limited to the shape shown in FIGS. 4A and 4B. Also, the water-repellent layer 120 using the aerogel nanocomposite is coated on the substrate 100 and thus has the same shape as that of the surface of the substrate 100.

A superhydrophobic coating film may be prepared by applying, on the substrate 100, a water-repellent solution prepared by dissolving the hydrophobic aerogel prepared by the above method in a hydrophobic inorganic nano-sol. For example, the water-repellent layer 120 may be formed by applying a solution using one or more methods out of brush coating, spin coating, spray coating, and dip coating.

FIG. 4B illustrates the substrate 100, a primer player 110 coated on the substrate 100, and the water-repellent layer 120 formed on a top of the primer layer 110. Before applying a water-repellent solution, the primer layer 110 may be formed by applying and curing a hydrophobic inorganic nano-sol on at least one surface of the substrate 100. When the primer layer 110 is formed by curing the hydrophobic inorganic nano-sol, the hardness of the substrate 100 may be considerably improved and the hydrophobic aerogel particles may be fixed.

The primer layer 110 may be formed by coating the hydrophobic inorganic nano-sol on a single surface or both surface of the substrate 100, subjected to the pretreatment, using a method including one of brush coating, spin coating, and spray coating and fully curing the hydrophobic inorganic nano-sol. In the same manner as above, the water-repellent layer 120 may be formed by coating and curing the aerogel water-repellent solution on the top of the primer layer 110. Also, to adjust the thickness and hardness of the water-repellent layer 120, the above processes may be repeated several times. The thickness of the water-repellent layer 120 may be 1 μm or greater, preferably 10 to 50 μm.

The hydrophobic inorganic nano-sol used in the primer layer 110 may be silica sol or silica-hybrid sol, and the thickness of the primer layer 110 may be 1 μm or greater.

Since the hydrophobic aerogel has a stable structure but is ultralight, a process of making the hydrophobic aerogel into an aerogel nanocomposite is required to overcome a disadvantage of insufficient mechanical hardness. The aerogel nanocomposite may be prepared by dissolving the hydrophobic aerogel shown in FIG. 1B in hydrophobic inorganic nano-sol having water-repellent properties. In the water-repellent solution consisting of aerogel nanocomposites, the hydrophobic inorganic nano-sol may serve as a binder to fix the hydrophobic aerogel particles.

The hydrophobic inorganic nano-sol having water-repellent properties may include silica-sol or silica-hybrid sol, and a silicon compound included may be one of methyltrimethoxysilane, methyltrichlorosilane, ethyltrimethoxysilane, ethyltriethoxysilane, phenyltrimethoxysilane), phenyltrichlorosilane, phenylaminopropyltrimethoxysilane, octyltrimethoxysilane, octyltrichlorosilane, octadecyltrimethoxysilane, octadecyltrichlorosilane, propyltrimethoxysilane, n-propyltriethoxysilane, isopropyltriethoxysilane, isobutyltrimethoxysilane, vinyltriethyloxy silane, vinyltrimethoxysilane, and allyltrimethoxysilane, or a combination thereof.

In addition to the hydrophobic inorganic nano-sol, a mixture of deionized water (DI water) and isopropyl alcohol (IPA) at an appropriate ratio may be used as a solvent in the aerogel water-repellent solution to dilute the solution.

In an embodiment of the present invention, a process of drying the superhydrophobic coating film prepared by the above method may be performed. It may be preferable to perform the drying process for 1 hour at a range of 60 and 100° C. After drying, a process of removing particles that are not fixed onto the substrate surface may be performed.

As shown in FIGS. 4A and 4B, the water-repellent layer 120 may be formed on the substrate 100 or the primer layer 100 using the aerogel nanocomposite. The water-repellent layer 120 may have a contact angle of 100° to 160° and a thickness of 1 to 100 μm.

Figure 5A:
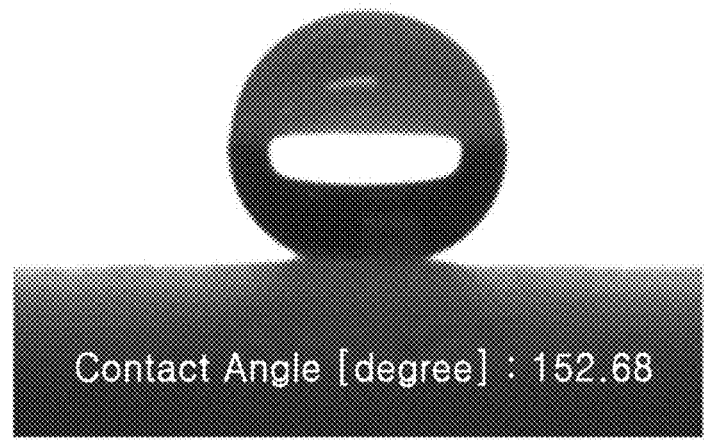
FIGS. 5A and 5B show contact angle measurement images of a superhydrophobic coating film using a hydrophobic aerogel nanocomposite according to one embodiment of the present invention.
Figure 5B:
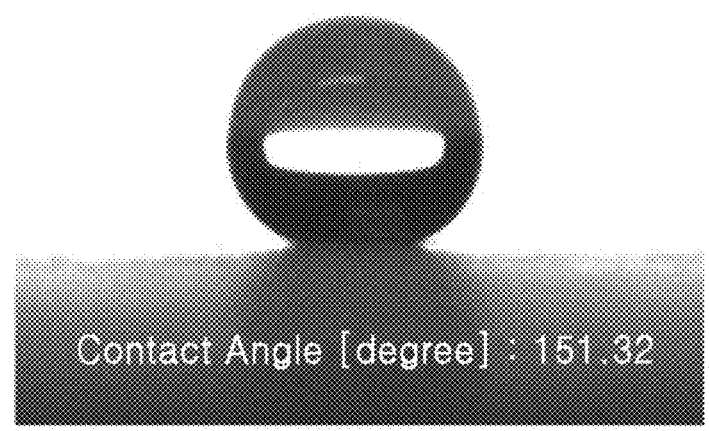

FIGS. 5A and 5B show contact angle measurement images of superhydrophobic surfaces of hydrophobic aerogel nanocomposites made by atmospheric pressure drying and supercritical drying according to one embodiment of the present invention. FIG. 5A shows the contact angle of the nanocomposite surface when a hydrophobic aerogel dried under atmospheric pressure after solvent replacement and surface modification is used and FIG. 5B shows the contact angle of the nanocomposite surface when a hydrophobic aerogel prepared by supercritical drying is used.

Hereinafter, experimental examples are described to assist in understanding the present invention. The following experimental examples are, however, provided herein for illustration purpose only, and the present invention is not limited thereto.

Experimental Example 1

In order to easily understand characteristics of superhydrophobic aerogel nanocomposite, a wood substrate (with dimensions (width×length×height) of 10 cm×10 cm×1.2 cm, laminated cypress wood), a glass substrate (soda-lime glass, with dimensions of 10 cm×10 cm×0.3 cm), aluminum foil, a copper plate (with dimensions of 10 cm×10 cm×0.1 cm), and a PET substrate (with dimensions of 6 cm×6 cm×0.01 cm) were prepared as substrates of the examples. Among the prepared substrates, the wood substrate was immersed in ethanol, ultrasonically cleaned for 10 minutes, and then dried at 60° C. for 6 hours to carry out a pretreatment process for removing foreign substances, and the glass substrate and the copper plate were used after ethanol cleaning.

A process of coating a primer layer on some of the substrates subjected to the pretreatment process may be performed. The primer layer was formed by brush coating or spin coating hydrophobic inorganic nano-sol. In the above experimental example, as an example of the hydrophobic inorganic nano-sol, a colloidal silica-based sol was used. The drying treatment was performed by fully curing at 80° C. for 6 hours.

Then, an aerogel nanocomposite water-repellent solution including a hydrophobic aerogel was prepared. As an example of the hydrophobic aerogel, a hydrophobic aerogel prepared through atmospheric pressure drying of a wet gel after solvent replacement and surface treatment or a hydrophobic aerogel prepared through supercritical drying was used in the present experimental example.

Specifically, the aerogel nanocomposite water-repellent solution was prepared by dissolving the hydrophobic aerogel powders in the hydrophobic inorganic nano-sol. At this time, as an example of the hydrophobic inorganic nano-sol, a colloidal silica-based sol was used, which was diluted with IPA and DI water to lower viscosity thereof. The concentration in the solution was changed by adjusting the content of the hydrophobic aerogel, and a mixture at a constant ratio according to the concentration was strongly dispersed for 20 minutes using a homogenizer to prepare the aerogel water-repellent solution.

The prepared aerogel nanocomposite water-repellent solution was easily coated on the substrate using brush coating selected from liquid coating methods, and was subjected to drying treatment to form a hydrophobic coating film. The drying treatment was carried out at 100° C. for 1 hour. Lastly, a process of removing aerogel particles that were not fixed to the substrate surface was performed after drying treatment of the coated substrate.

In some of the above experimental examples, a primer layer may be formed before forming the aerogel nanocomposite. The formation method of the primer layer will be described in detail in the following experimental examples. Table 1 summarizes preparation process steps of samples prepared according to experimental examples of the present invention.

TABLE 1

| Experimental Example | Substrate | Pretreatment | Primer Layer | Type of Water-repellent Layer | Drying Temperature (° C.) |
|---|---|---|---|---|---|
| 2 | Wood | O | X | Hydrophobic aerogel | 100 |
| 3 | Wood | O | X | Hydrophilic aerogel | 100 |
| 4 | Wood | O | O | Hydrophobic aerogel | 100 |
| 5 | Glass | O | X | Hydrophobic aerogel | 100 |
|  | Aluminum Foil | O | X | Hydrophobic aerogel | 100 |
|  | Copper Plate | O | X | Hydrophobic aerogel | 100 |
|  | PET | O | X | Hydrophobic aerogel | 100 |
|  | Wood | O | X | Hydrophobic aerogel | 80 |

Experimental Example 2

Table 2 shows the hydrophobic aerogel contents in the aerogel water-repellent solution samples corresponding to Experimental Examples 2a to 2h and measurements of corresponding changes in contact angle, and shows the contents of the hydrophobic aerogel and the hydrophobic inorganic nano-sol when the total solution was fixed to 40 g. The hydrophobic inorganic nano-sol was diluted with IPA and DI water in consideration of the particle size and the specific surface area of the hydrophobic aerogel, and then the experiments were carried out in a fixed state. The experimental examples respectively show changes of contact angle of a hydrophobic coating film when the weight ratio of the hydrophobic aerogel, which was prepared through atmospheric pressure drying, in the aerogel water-repellent solution was changed to 2.5 wt %, 5 wt %, 7.5 wt %, 10 wt %, 12.5 wt % 15 wt % 17.5 wt %, and 20 wt %.

Figure 6:
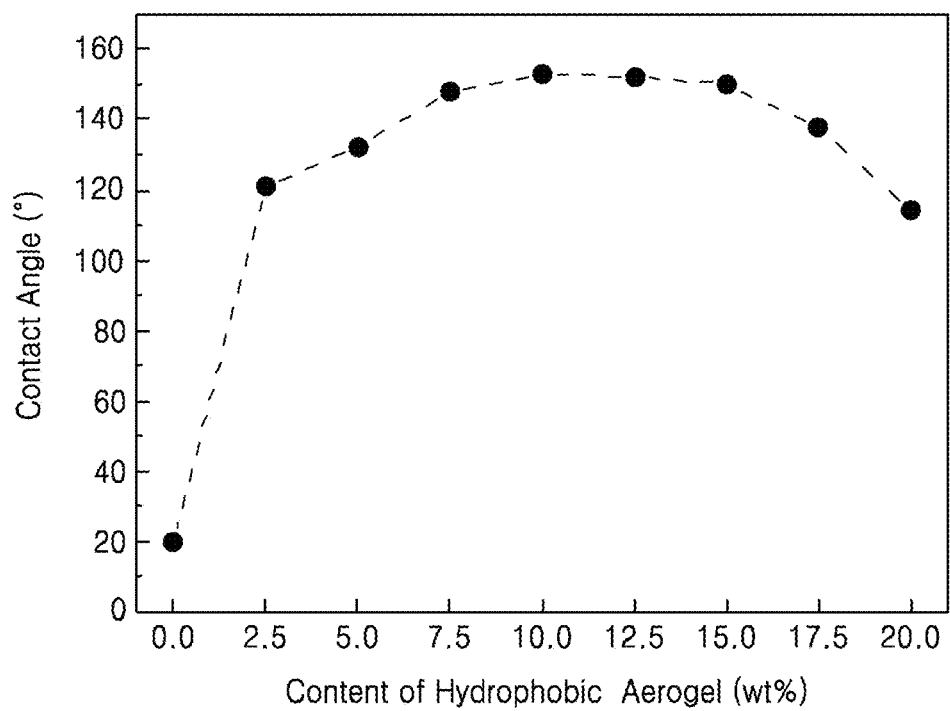
FIG. 6 is a graph showing the change in contact angle according to the content of an atmospheric pressure dried hydrophobic aerogel according to one embodiment of the present invention.

FIG. 6 shows the change in contact angle on the aerogel nanocomposite surface coated on the substrate according to the increase in the content of the hydrophobic aerogel prepared through atmospheric pressure drying. Irregularity is observed in some intervals due to the nature of the rough nanocomposite surface, but the deviation is not large, and a tendency of increase in contact angle with an increase in the hydrophobic aerogel concentration is shown. When the content of the hydrophobic aerogel is 10 wt %, the highest contact angle is observed. When the content of the hydrophobic aerogel exceeds 15 wt %, the contact angle tends to decrease. Water-repellent properties were exhibited in Experimental Examples 2a to 2h, and characteristics of a superhydrophobic coating film with the contact angle of 150° or greater were exhibited in Experimental Examples 2d, 2e, and 2f.

Figure 7:
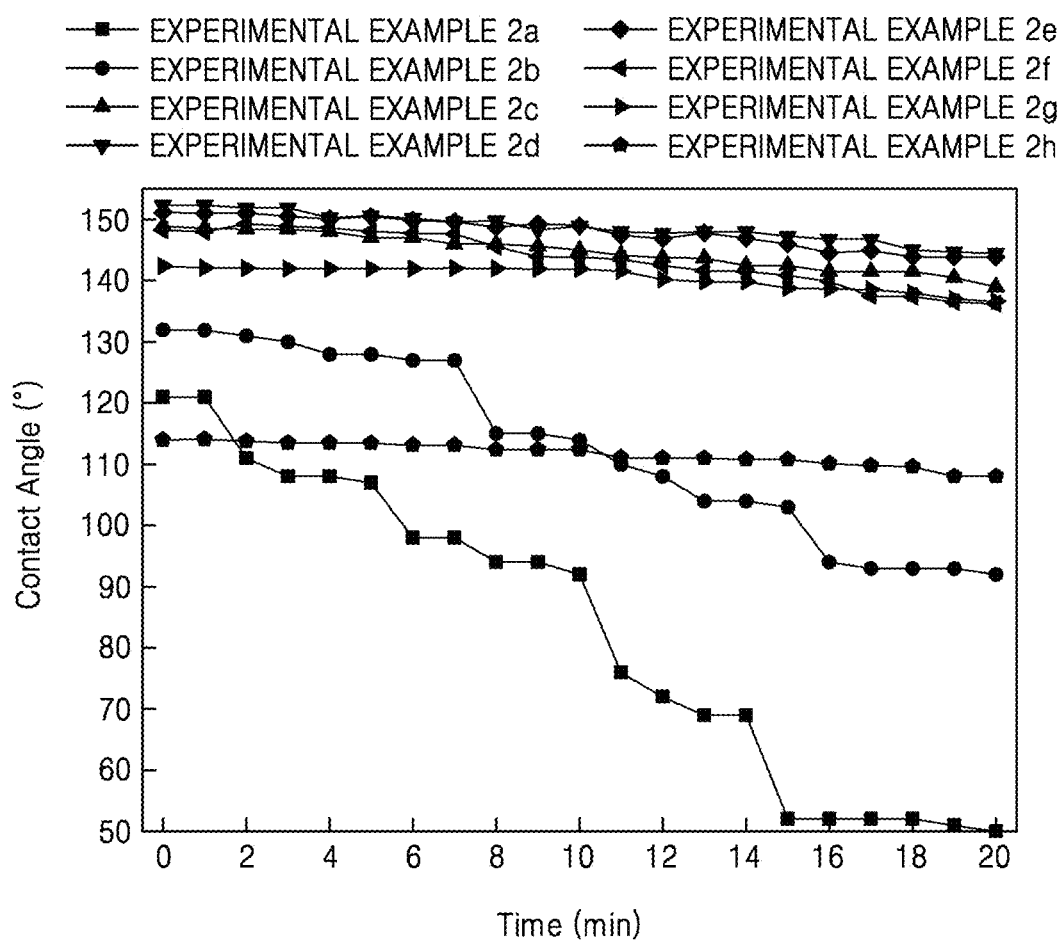
FIG. 7 is a graph showing the retention time and change of water droplet contact angle in a hydrophobic aerogel nanocomposite according to one embodiment of the present invention.
Figure 8A:
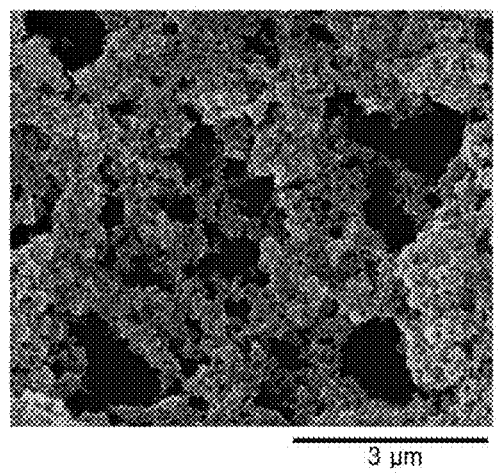
FIGS. 8A to 8D show SEM images of a nanocomposite surface according to the content of hydrophobic aerogel according to one embodiment of the present invention.
Figure 8B:
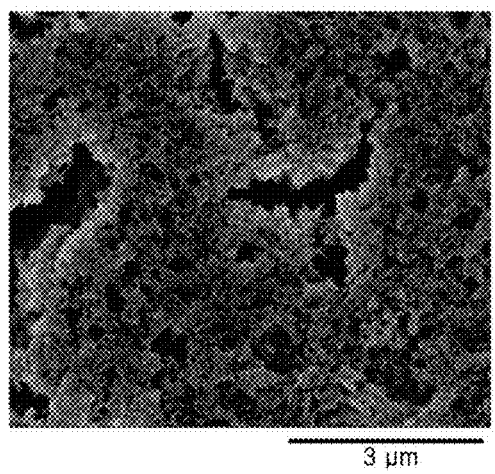
Figure 8C:
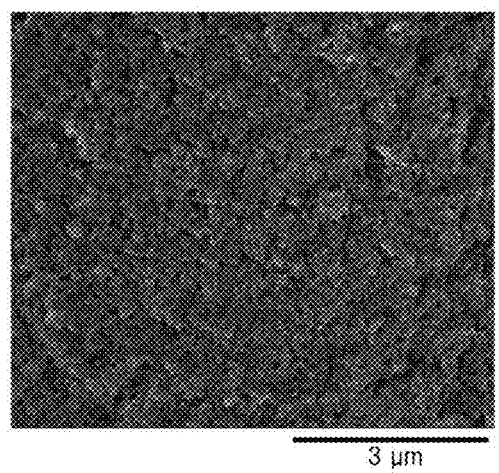
Figure 8D:
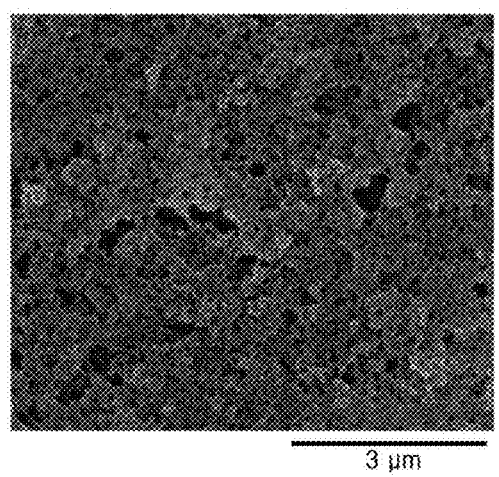

Referring to FIG. 7, an optimal hydrophobic aerogel content may be determined by checking the retention time and change of water droplet contact angle in the hydrophobic aerogel nanocomposite formed on the wood substrate.

FIGS. 8A to 8D show SEM images of the aerogel nanocomposite surface prepared according to the above Experimental Example 2. FIGS. 8A to 8D show surfaces of Experimental Examples 2a, 2b, 2d, and 2f, respectively, and the changes of surface according to the hydrophobic aerogel content are observed. When observing the surface of the aerogel nanocomposite from FIGS. 8A to 8C, it is confirmed that the surface contact angle was improved as the aerogel water-repellent solution was well coated. Also, referring to FIG. 8D, the content of the hydrophobic inorganic nano-sol is increased and a phenomenon occurs in which aerogel particles are aggregated and dried. The resulting decrease of the surface contact angle may be expected from the SEM image.

Therefore, in Experimental Examples 2a and 2b in the present invention, it can be understood that water droplets easily penetrate into empty spaces between the hydrophobic aerogel particles, thereby degrading the characteristics of the hydrophobic aerogel nanocomposite, and in Experimental Example 2f and the subsequent examples, the aerogel particles were excessively aggregated on the surface of the hydrophobic aerogel nanocomposite by the hydrophobic inorganic nano-sol, thereby degrading the exhibited characteristics. In the present experimental example, the hydrophobic aerogel content may be adjusted to find a condition in which high contact angle and durability are achieved and sedimentation does not occur.

TABLE 2

| Experimental Example | Hydrophobic Aerogel (wt %) | Hydrophobic Aerogel (g) | Inorganic Nano-sol (g) | Sedimentation (g) | Pencil Hardness | Contact Angle (°) |
|---|---|---|---|---|---|---|
| 2a | 2.5 | 1 | 39 | X | B | 121 |
| 2b | 5 | 2 | 38 | X | B | 132 |
| 2c | 7.5 | 3 | 37 | X | 3B | 148 |
| 2d | 10 | 4 | 36 | X | 3B | 153 |
| 2e | 12.5 | 5 | 35 | X | 3B | 152 |
| 2f | 15 | 6 | 34 | X | 5B | 150 |
| 2g | 17.5 | 7 | 33 | X | 9B | 138 |
| 2h | 20 | 8 | 32 | O | 9B | 114 |

Experimental Example 3

Table 3 shows the hydrophobic aerogel contents in the aerogel water-repellent solution samples corresponding to Experimental Examples 3a to 3h and measurements of corresponding changes in contact angle, and shows the contents of the hydrophobic aerogel and the hydrophobic inorganic nano-sol when the total solution was fixed to 40 g. The hydrophobic inorganic nano-sol was diluted with IPA and DI water in consideration of the particle size and the specific surface area of the hydrophobic aerogel, and then the experiments were carried out in a fixed state. The experimental examples respectively show changes of contact angle of a hydrophobic coating film when the weight ratio of the hydrophobic aerogel, which was prepared through supercritical drying, in the aerogel water-repellent solution was changed to 2.5 wt %, 5 wt %, 7.5 wt %, 10 wt %, 12.5 wt % 15 wt % 17.5 wt %, and 20 wt %.

Figure 9:
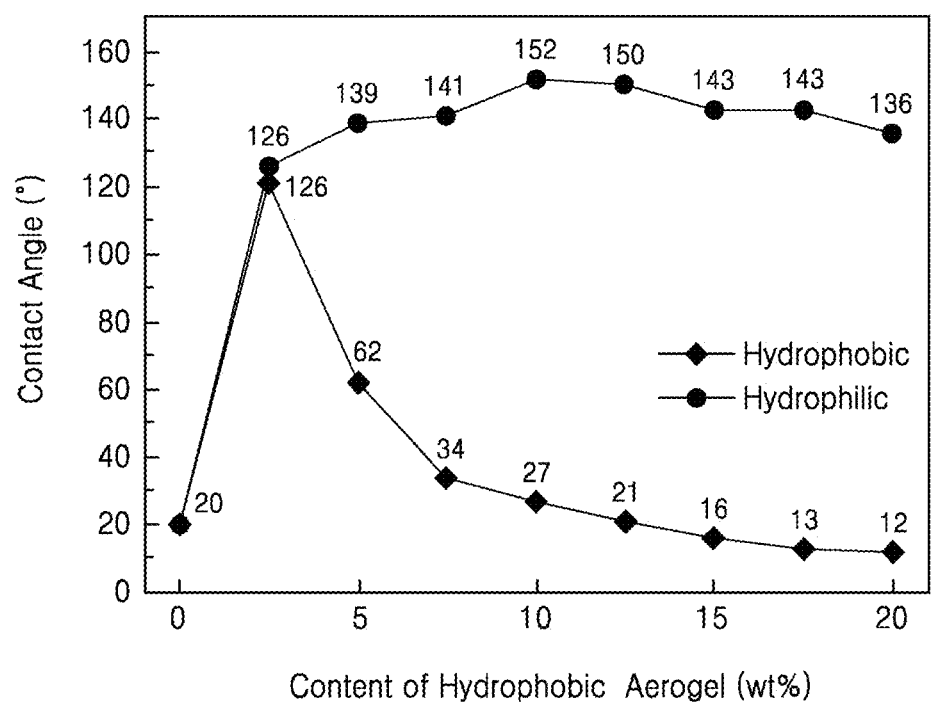
FIG. 9 is a graph showing the change in contact angle according to the content of supercritical-dried hydrophilic and hydrophobic aerogel according to one embodiment of the present invention.

FIG. 9 shows the change in contact angle according to the contents of hydrophilic and hydrophobic aerogel prepared by supercritical drying in accordance with one embodiment of the present invention is shown. Irregularity is observed in some intervals due to the nature of the rough nanocomposite surface, but the deviation is not large, and a tendency of decrease in contact angle with an increase in the content of the hydrophilic aerogel concentration and a tendency of increase in contact angle with an increase in the content of the hydrophobic aerogel are shown. In the case of a water-repellent solution including the hydrophobic aerogel by supercritical drying, the surface of the hydrophobic aerogel nanocomposite exhibited high contact angle in a range of 2.5 to 20 wt %, preferably 7.5 to 17.5 wt %, and exhibited the highest contact angle at 10 wt %.

ing film with a contact angle of 150° or greater were exhibited in Experimental Examples 4d to 4f. In addition, the contact angle of the superhydrophobic surface of the aerogel nanocomposite prepared according to Experimental Example 4d was 152° and it was identified that the superhydrophobic coating film was formed. In addition, it was confirmed that there was almost no decrease in the contact angle in Experimental Examples 4b to 4f as compared with Experimental Example 2.

Figure 10A:
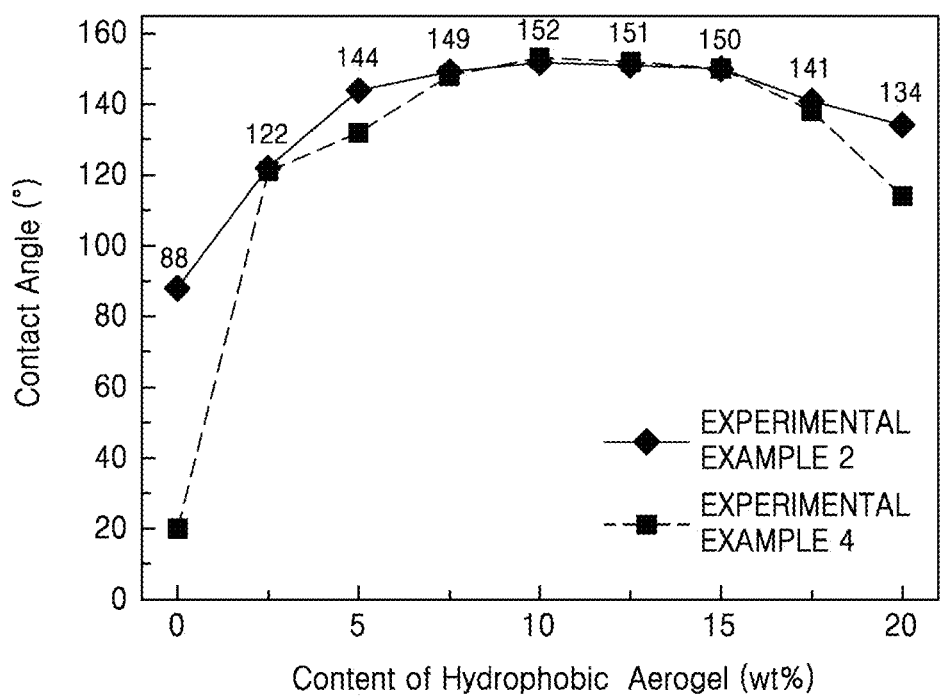
FIGS. 10A and 10B show graphs showing the change in contact angle of a superhydrophobic surface of a nanocomposite according to whether or not a primer layer has been formed in the atmospheric pressure dried hydrophobic aerogel and in the supercritical dried hydrophobic aerogel according to one embodiment of the present invention.
Figure 10B:
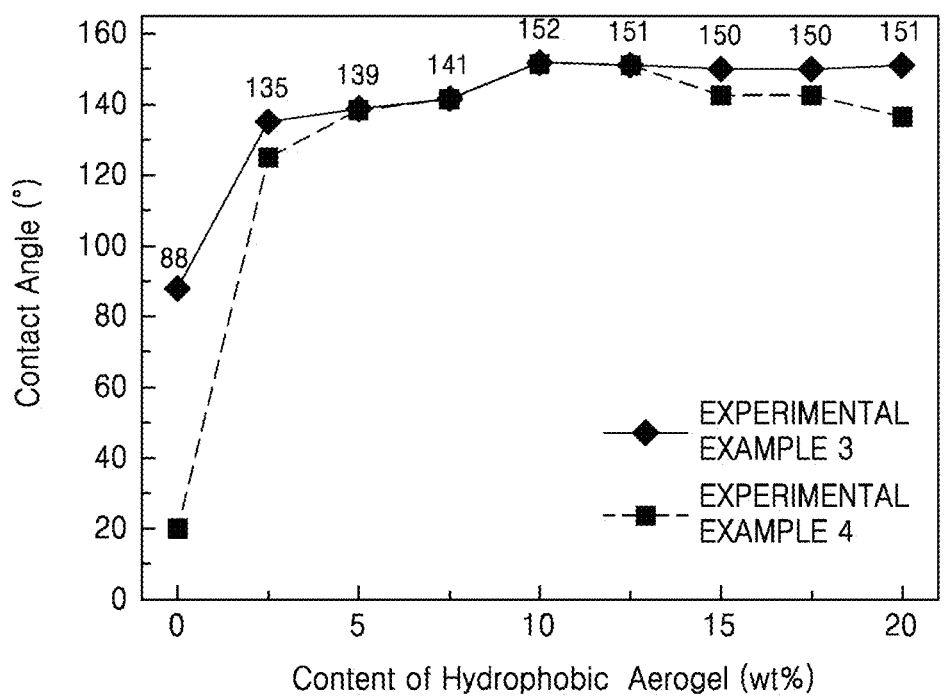

In the same way, FIG. 10B shows the change in contact angle according to an increase in the content of the hydrophobic aerogel on the surface of the supercritical-dried hydrophobic aerogel nanocomposite on the substrate on

TABLE 3

| Experimental Example | Hydrophobic Aerogel (wt %) | Hydrophobic Aerogel (g) | Inorganic Nano-sol (g) | Sedimentation (g) | Pencil Hardness | Contact Angle (°) |
|---|---|---|---|---|---|---|
| 3a | 2.5 | 1 | 39 | X | B | 128 |
| 3b | 5 | 2 | 38 | X | B | 139 |
| 3c | 7.5 | 3 | 37 | X | 3B | 141 |
| 3d | 10 | 4 | 36 | X | 3B | 152 |
| 3e | 12.5 | 5 | 35 | X | 3B | 150 |
| 3f | 15 | 6 | 34 | X | 5B | 143 |
| 3g | 17.5 | 7 | 33 | X | 9B | 143 |
| 3h | 20 | 8 | 32 | O | 9B | 138 |

Experimental Example 4

Table 4 corresponds to Experimental Examples 4a to 4h and shows measurements of changes in contact angle according to the content of hydrophobic aerogel of an atmospheric pressure dried hydrophobic aerogel water-repellent solution sample after forming a primer layer on a substrate. In addition, Table 5 corresponds to Experimental Examples 4i to 4p and shows measurements of changes in the hydrophobic aerogel content of a supercritical-dried hydrophobic aerogel water-repellent solution sample after forming a primer layer on a substrate.

The primer layer was formed by coating and fully curing hydrophobic inorganic nano-sol on a wood substrate subjected to a pretreatment process. In detail, hydrophobic inorganic nano-sol was brush coated, then dried at 80° C. for 6 hours, and fully cured to form a primer layer. In the above experimental example, as one example of the hydrophobic inorganic nano-sol, colloidal silica-based sol was used. Subsequently, an aerogel water-repellent solution was coated on the fully cured primer layer in the same method as in Experimental Example 2 to form a water-repellent layer.

FIG. 10A shows the change in contact angle according to an increase in the content of the hydrophobic aerogel on the surface of the atmospheric pressure dried hydrophobic aerogel nanocomposite on the substrate on which the primer layer is formed. Characteristics of a superhydrophobic coating film with a contact angle of 150° or greater were exhibited in Experimental Examples 4l to 4p. In addition, the contact angle of the superhydrophobic surface of the aerogel nanocomposite prepared according to Experimental Example 4l was 152° and it was identified that the superhydrophobic coating film was formed. In addition, it was confirmed that there was almost no decrease in the contact angle as compared with Experimental Example 3.

Figure 11A:
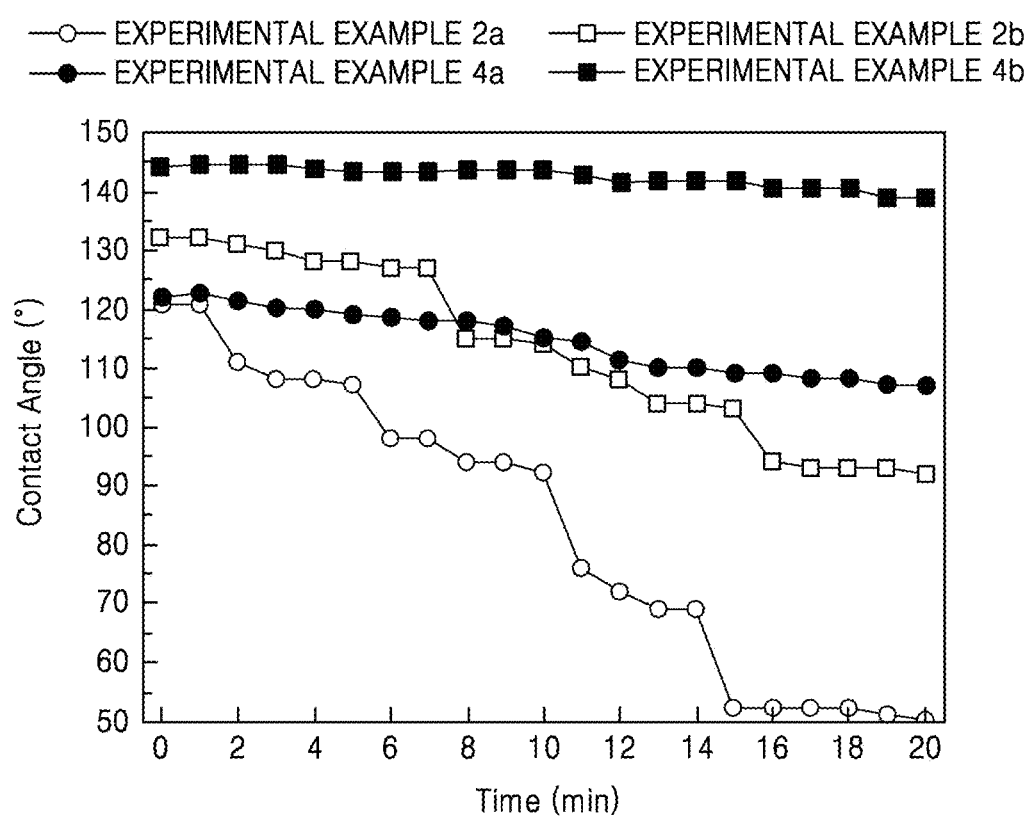
FIGS. 11A and 11B show graphs showing the retention time and change of water droplet contact angle on a superhydrophobic surface of a nanocomposite according to whether or not the primer layer has been formed according to one embodiment of the present invention.
Figure 11B:
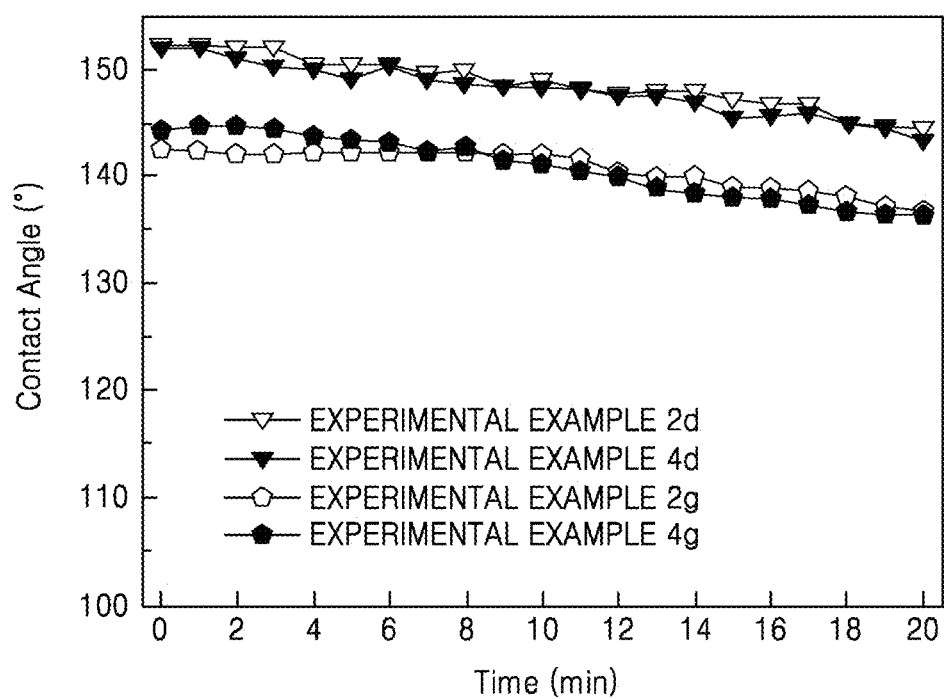

Referring to FIGS. 11A and 11B, by checking the retention time and change of the water droplet contact angle of the atmospheric pressure dried hydrophobic aerogel nanocomposite according to whether or not a primer layer is formed, it is possible to identify the effect when a water-repellent layer is formed on the substrate on which the primer layer is formed. Referring to FIG. 11A, in comparison with Experimental Example 2, when the primer layer was formed, the contact angle of the water droplet was less decreased with time in Experimental Examples 4a and 4b, and hence it can be confirmed that the surface of the aerogel nanocomposite was better formed. Also, it can be confirmed from FIG. 11B that there was almost no change in the contact angle of the water droplet with time in Experimental Examples 4d and 4g in which the superhydrophobic properties were exhibited.

TABLE 4

| Experimental Example | Hydrophobic Aerogel (wt %) | Hydrophobic Aerogel (g) | Inorganic Nano-sol (g) | Sedimentation (g) | Pencil Hardness | Contact Angle (°) |
|---|---|---|---|---|---|---|
| 4a | 2.5 | 1 | 39 | X | H | 122 |
| 4b | 5 | 2 | 38 | X | H | 144 |
| 4c | 7.5 | 3 | 37 | X | H | 149 |
| 4d | 10 | 4 | 36 | X | H | 152 |
| 4e | 12.5 | 5 | 35 | X | H | 151 |
| 4f | 15 | 6 | 34 | X | H | 150 |
| 4g | 17.5 | 7 | 33 | X | 2B | 141 |
| 4h | 20 | 8 | 32 | O | 2B | 134 |

TABLE 5

| Experimental Example | Hydrophobic Aerogel (wt %) | Hydrophobic Aerogel (g) | Inorganic Nano-sol (g) | Sedimentation (g) | Pencil Hardness | Contact Angle (°) |
|---|---|---|---|---|---|---|
| 4i | 2.5 | 1 | 39 | X | H | 136 |
| 4j | 5 | 2 | 38 | X | H | 139 |
| 4k | 7.5 | 3 | 37 | X | H | 141 |
| 4l | 10 | 4 | 36 | X | H | 152 |
| 4m | 12.5 | 5 | 35 | X | H | 151 |
| 4n | 15 | 6 | 34 | X | H | 150 |
| 4o | 17.5 | 7 | 33 | X | 2B | 150 |
| 4p | 20 | 8 | 32 | O | 2B | 151 |

Comparative Example

Figure 12:
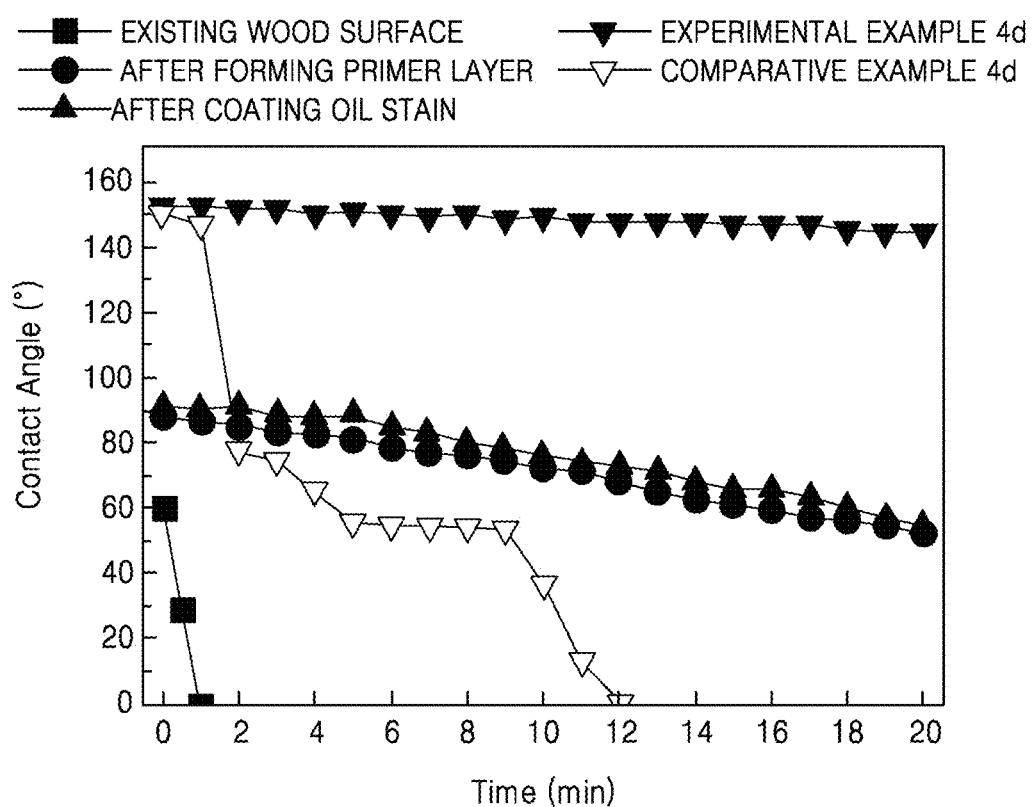
FIG. 12 is a graph showing the retention time and change of water droplet contact angle when a wood surface is coated with oil stain and an aerogel nanocomposite according to one embodiment and a comparative example of the present invention.

Referring to FIG. 12, it is possible to identify the retention time and change of the contact angle of the water droplet when various treatments are performed on the wood substrate. In the case of the wood that was not subjected to any treatment and was used in the above experimental examples, all of the droplets permeated within 2 minutes. In addition, when a substrate was used which was coated with oil stain sold as a water-repellent coating agent for maintaining the properties and shape of a wood substrate, a reduction amount, similar to that when the primer layer was formed in the above experimental examples, was observed. The result of the above Experimental Example 4d is plotted on the graph, from which it can be understood that the case where the hydrophobic aerogel prepared by atmospheric pressure drying is coated on the primer layer shows a significantly small reduction amount of contact angle with time as compared to the oil stain and hence the hydrophobic aerogel is suitable for use for a water-repellent layer. In addition, in Comparative Example 4, a hydrophobic aerogel was not dissolved in a hydrophobic inorganic nano-sol, but was dispersed using IPA as a solvent. As a result of comparison, it can be understood that the contact angle of the water droplet was reduced to 30° or less within 10 minutes and the hydrophobic inorganic nano-sol acted as a binder to hold the hydrophobic aerogel.

Experimental Example 5

Table 6 shows changes in the contact angle according to the content of hydrophobic aerogel when a hydrophobic aerogel nanocomposite surface was formed on various substrates as samples corresponding to Experimental Example 5. It can be understood that the application to various substrates is possible by coating an aerogel water-repellent solution on a glass substrate, aluminum foil, a copper plate, and a PET substrate. In addition, in the above experimental examples, the nanocomposite surface was formed using the hydrophobic aerogel prepared through atmospheric pressure drying.

Figure 13A:
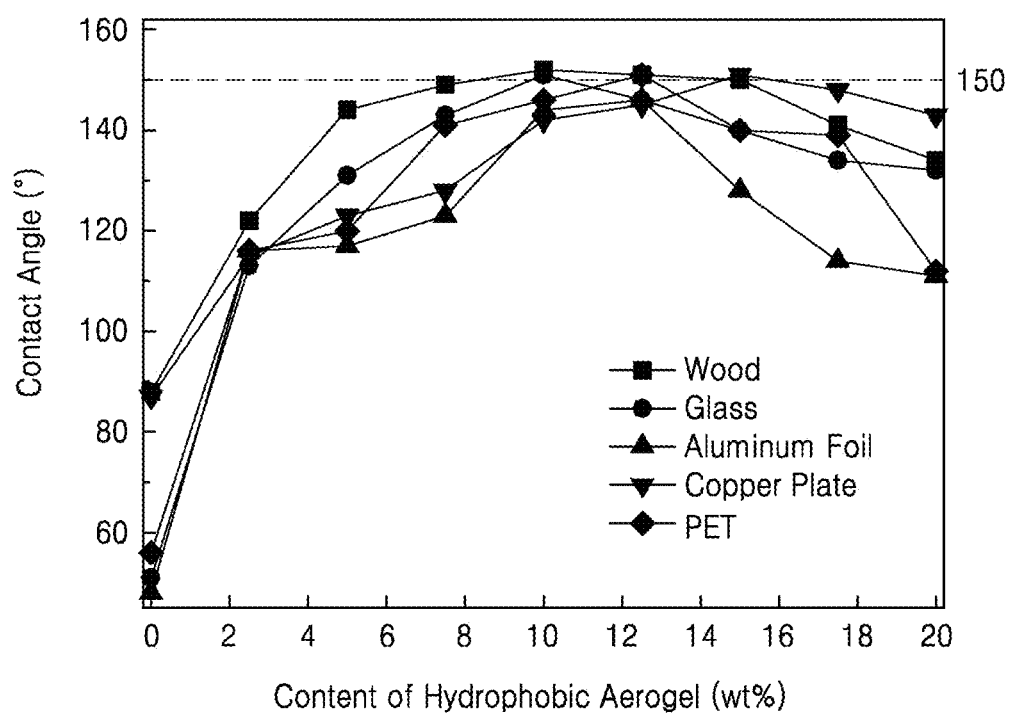
FIGS. 13A and 13B are graphs showing contact angle characteristics of a hydrophobic aerogel nanocomposite surface on various substrates according to one embodiment and a comparative example of the present invention.
Figure 13B:
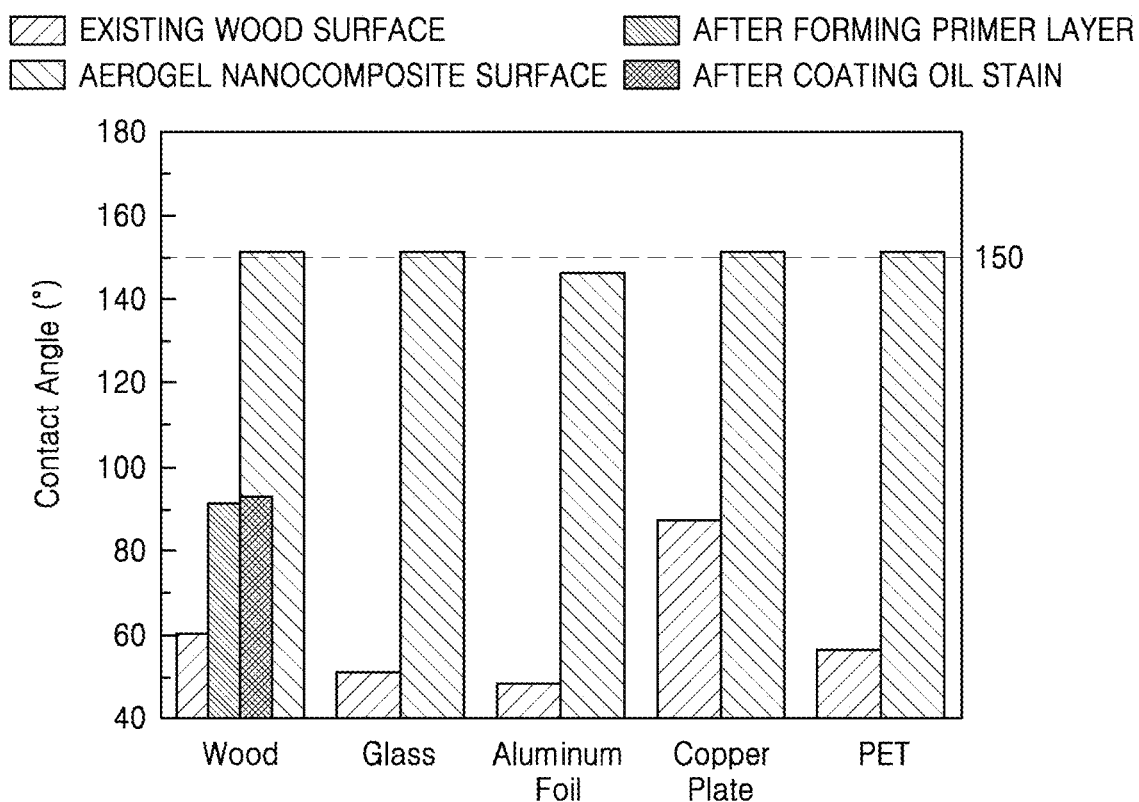
Figure 14A:
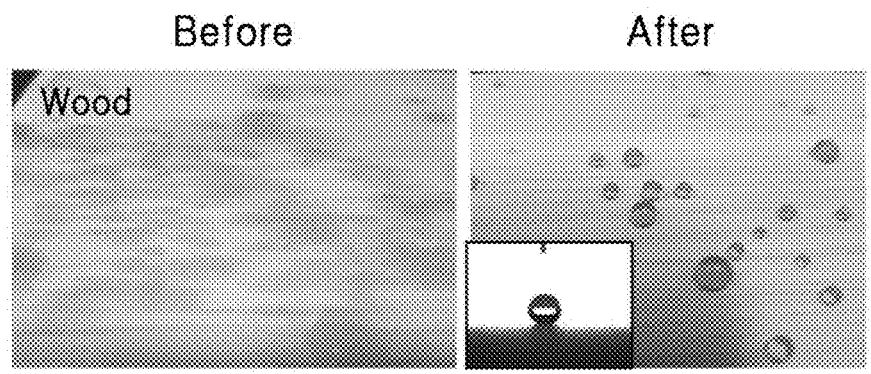
FIGS. 14A to 14E show images of water droplets and contact angle before and after a hydrophobic aerogel nanocomposite surface is formed on various substrates according to one embodiment of the present invention.
Figure 14B:
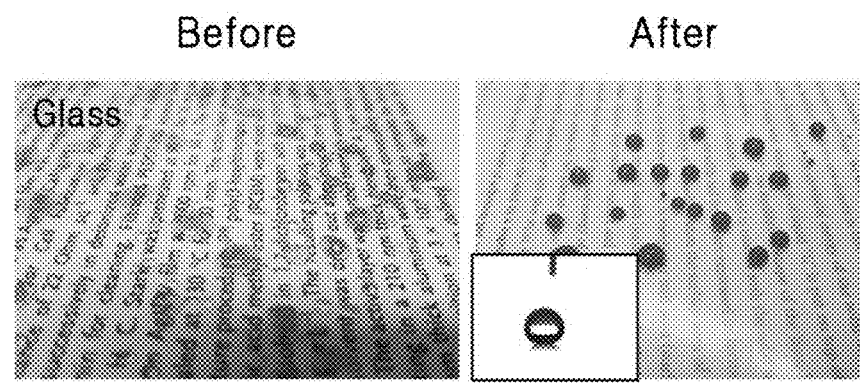
Figure 14C:
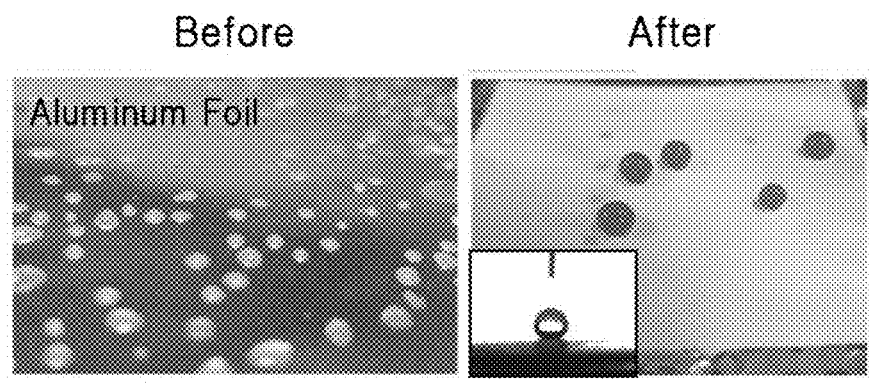
Figure 14D:
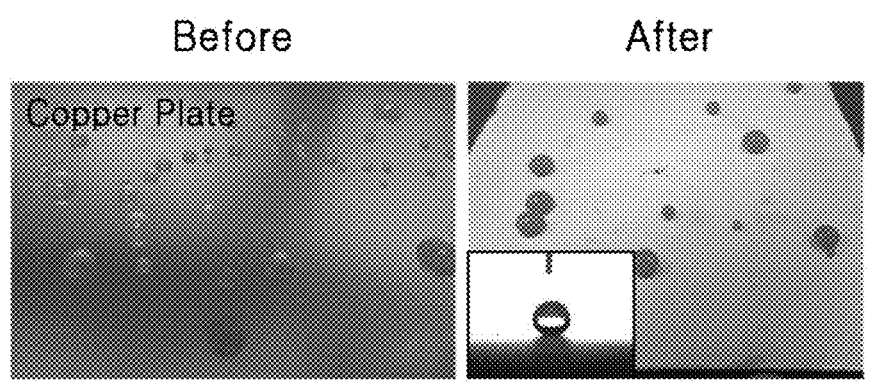
Figure 14E:
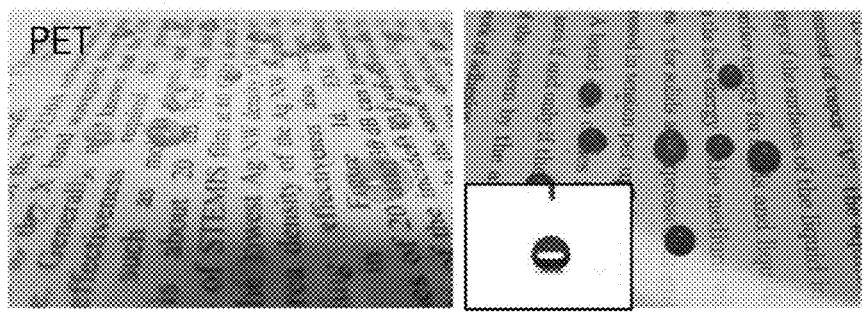

FIGS. 13A and 13B are graphs showing contact angle according to the hydrophobic aerogel content when a hydrophobic aerogel nanocomposite surface is formed on various substrates. Referring to FIG. 13A, it can be understood that most of the substrates exhibit superhydrophobic properties. Also, it is shown that when the hydrophobic aerogel is 7.5 to 17.5 wt %, the contact angle is the highest in most of the substrate. Referring to FIG. 13B, it can be understood that various substrates exhibit superhydrophobic properties when the aerogel nanocomposite surface is formed.

FIGS. 14A to 14E show photographs of images when water droplets are dropped on the surface of a hydrophobic aerogel nanocomposite formed on various substrates, and contact angle measurement images.

TABLE 6

| Hydrophobic Aerogel (wt %) | Glass (°) | Aluminum Foil (°) | Copper Plate (°) | PET (°) |
|---|---|---|---|---|
| 0 | 51 | 48 | 87 | 56 |
| 2.5 | 113 | 116 | 115 | 116 |
| 5 | 131 | 117 | 123 | 120 |
| 7.5 | 143 | 123 | 128 | 141 |
| 10 | 151 | 144 | 142 | 146 |
| 12.5 | 146 | 146 | 145 | 151 |
| 15 | 140 | 128 | 151 | 140 |
| 17.5 | 134 | 114 | 148 | 139 |
| 20 | 132 | 111 | 143 | 112 |

Experimental Example 6

Figure 15A:
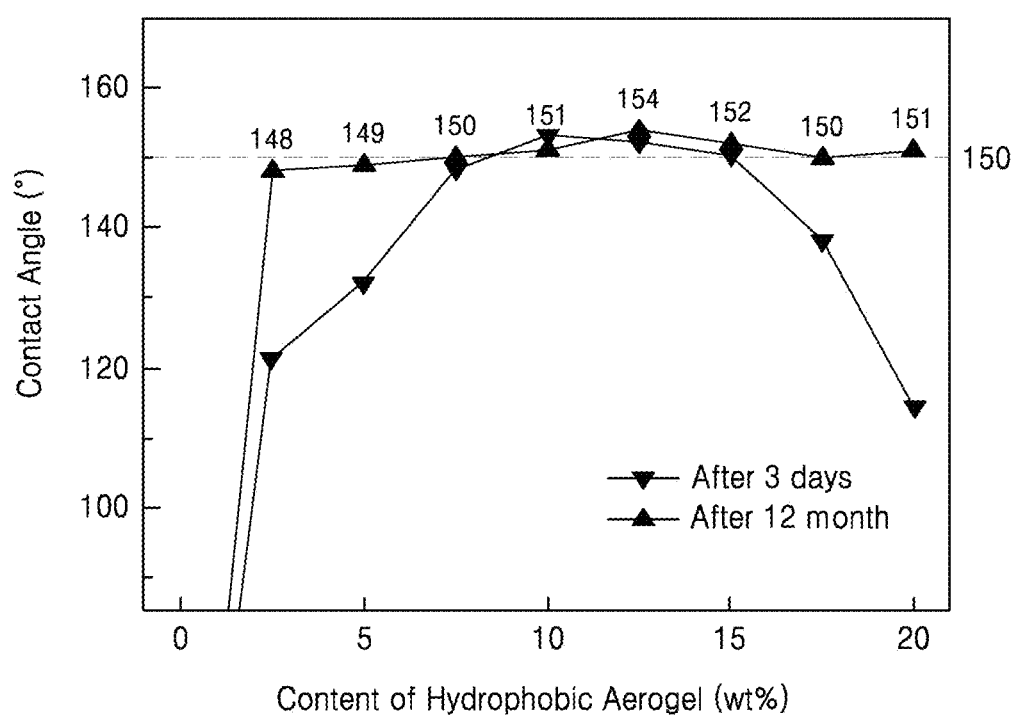
FIGS. 15A and 15B show graphs showing test results of water repellency persistency of a surface of hydrophobic aerogel nanocomposite prepared through atmospheric pressure drying and through supercritical drying according to one embodiment of the present invention.
Figure 15B:
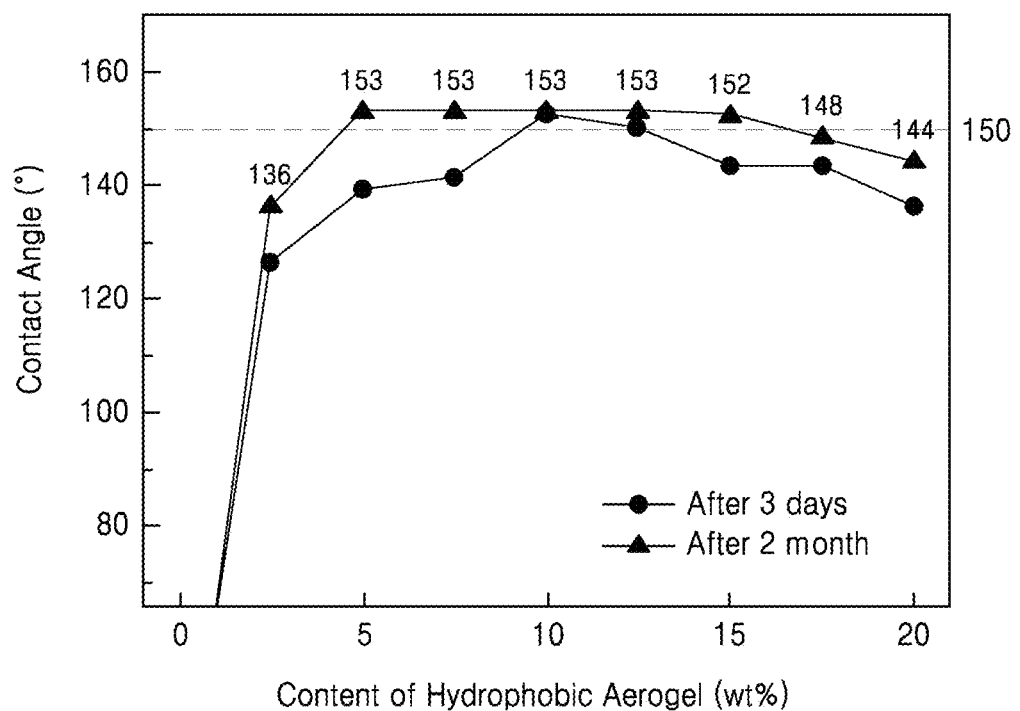

FIGS. 15A and 15B show persistency of water repellent properties according to an embodiment of the present invention. FIG. 15A shows the change in contact angle according to the concentration of the hydrophobic aerogel prepared by atmospheric pressure drying after solvent replacement and surface modification. When a contact angle is measured 12 months after a superhydrophobic coating film is formed, it appears that the contact angle increases or is maintained. In addition, when the content of the hydrophobic aerogel is in a range of 2.5 to 20 wt %, a high contact angle is observed. In addition, FIG. 15B shows the change in contact angle according to the concentration of the hydrophobic aerogel prepared through supercritical drying. Similarly, it can be understood that the contact angel considerably increases 2 months after the superhydrophobic coating film is formed. Particularly, a high contact angle is observed when the content of hydrophobic aerogel is in a range of 5 to 20 wt %. It can be understood that curing inside the coating film continues and is completed and the contact angle does not decrease and is maintained even after a long period of time. Accordingly, it can be confirmed that the durability of the superhydrophobic coating film of the present invention is improved and the continuity of the high contact angle is achieved.

Experimental Example 7

The aerogel nanocomposite water-repellent surface prepared according to the present invention has excellent superhydrophobic effects and good surface hardness. High hardness is essential for use in real time and is compared with that of oil stain presently used in practice.

Figure 16A:
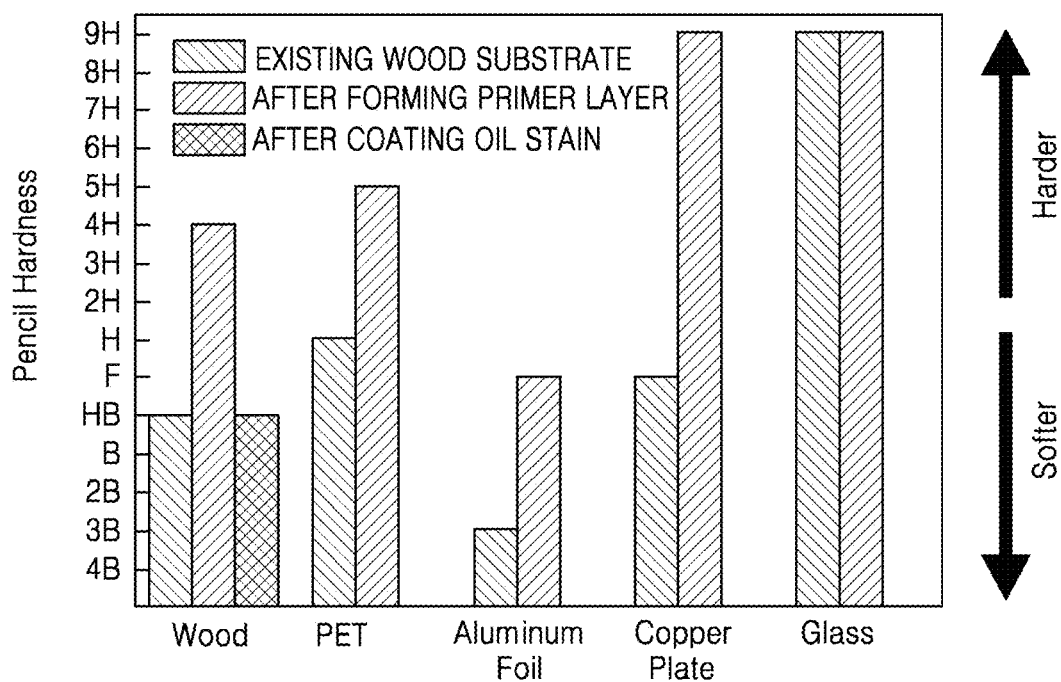
FIGS. 16A and 16B show graphs showing pencil hardness measurement values of an aerogel nanocomposite according to the presence and absence of a primer layer on various substrates according to one embodiment of the present invention.
Figure 16B:
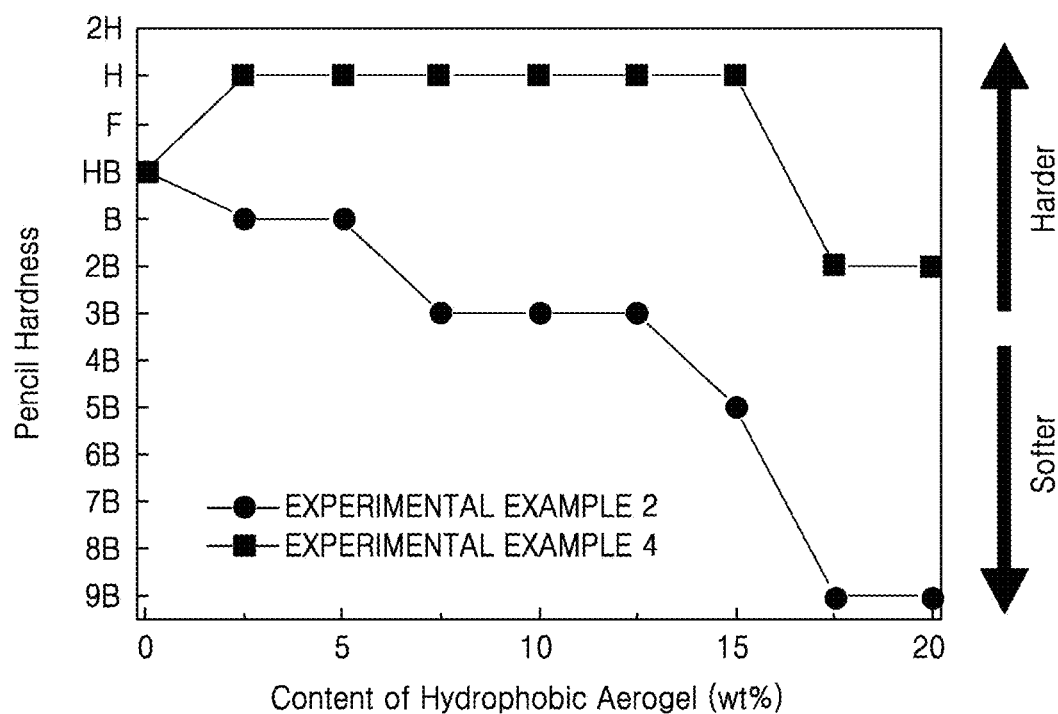

Referring to FIG. 16A, it can be understood that when a primer layer is prepared on various substrates, hardness is improved on the substrates on which the primer layer is formed. On the existing wood substrate, pencil hardness is considerably increased from HB to 4H. In particular, in the copper plate and the glass substrate, hardness that tolerates a level of 9H is measured. In addition, referring to FIG. 16B, a degree of improvement of hardness according to an increase in the content of hydrophobic aerogel in the wood substrate can be identified. In an existing nanocomposite on which the primer layer is not formed, the pencil hardness is decreased due to a part in which particles are aggregated as the content of hydrophobic aerogel increases, whereas when the primer layer is formed, the pencil hardness is significantly improved in the range of 7.5 wt % to 12.5 wt % in which a high contact angle is observed.

Figure 17A:
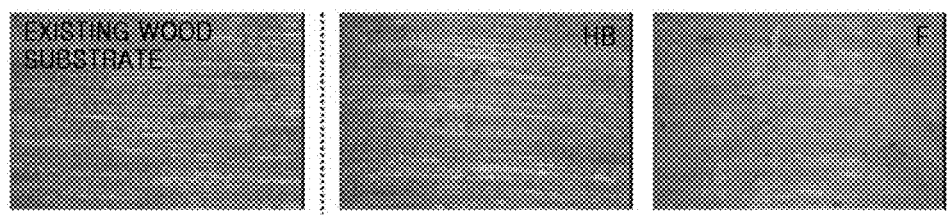
FIGS. 17A to 17E show optical microscope images of a surface after pencil hardness of an aerogel nanocomposite is measured according to the presence and absence of a primer layer on a wood substrate according to one embodiment of the present invention.
Figure 17B:
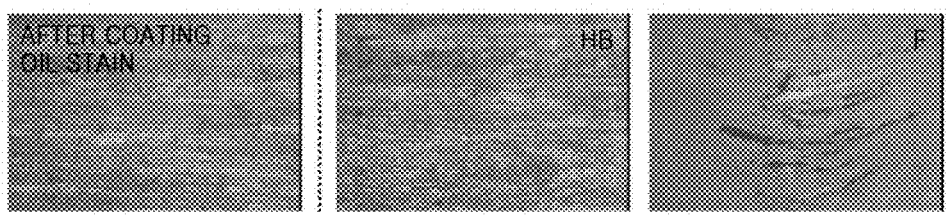
Figure 17C:
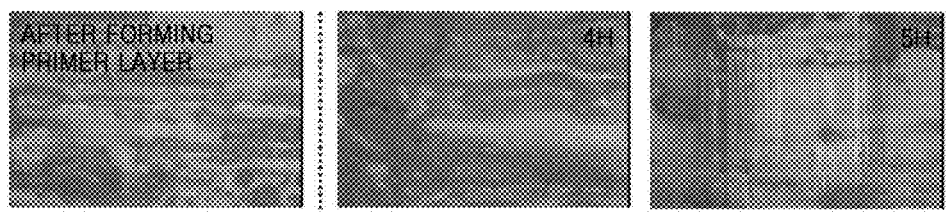
Figure 17D:
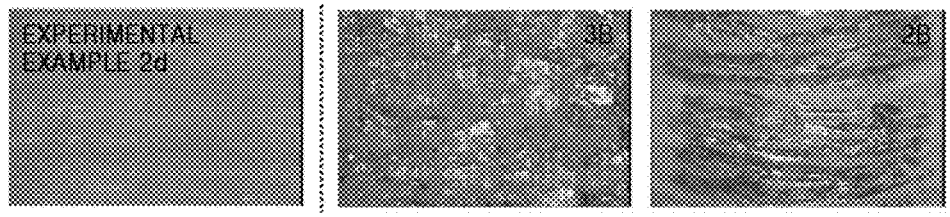
Figure 17E:
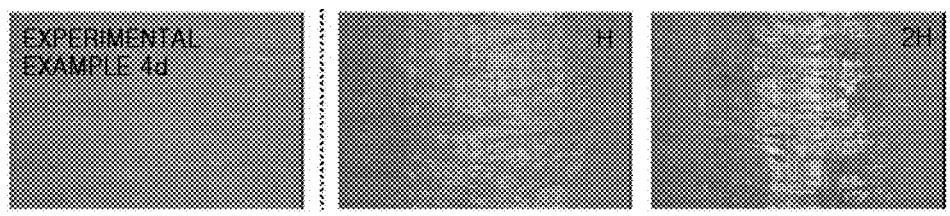

FIGS. 17A to 17E show images captured by an optical microscope obtained after measuring the pencil hardness of various experimental examples on a wood substrate. FIG. 17A is an optical microscope image after measuring the pencil hardness of an existing wood substrate (laminated cypress wood) generally used. It can be understood that the wood which is not subjected to any treatment is damaged at F. FIG. 17B shows optical microscope images obtained after measuring the pencil hardness of oil stain as a comparative example. It is seen that when the oil stain is used, the water-repellent properties are improved but the hardness of a surface is similar to the general wood which is not subjected to any treatment. Referring to FIG. 17C, it is seen that a high surface hardness of 4H is achieved when the pencil hardness is measured after the primer layer is prepared. It can be confirmed that the surface hardness is greatly increased as compared to the general wood which does not undergo any treatment. FIGS. 17B and 17E are optical microscope images when the pencil hardness of Experimental Examples 2d and 4d in which the contact angle was the highest was measured. It can be confirmed that the water-repellent coating layer was damaged at 2B and 2H in the experimental examples, respectively. In addition, in comparison with Experimental Example 2d, it can be understood that measurement values of the pencil hardness were significantly increased in Experimental Example 4d in which the primer layer was formed and the aerogel nanocomposite was coated. That is, when 10 wt % at which the superhydrophobic properties were exhibited was compared between these experimental examples, the pencil hardness was greatly increased from 3B to H.

As described above, it is confirmed that it is possible to prepare a superhydrophobic surface by producing surface roughness of the micro-nanocomposite structure using the hydrophobic aerogel according to the embodiment of the present invention. Also, it is identified that the durability of the above-described superhydrophobic coating film is improved by preparing the aerogel nanocomposite for improving low compressive strength and brittleness of the aerogel.

Experimental Example 8

Figure 18:
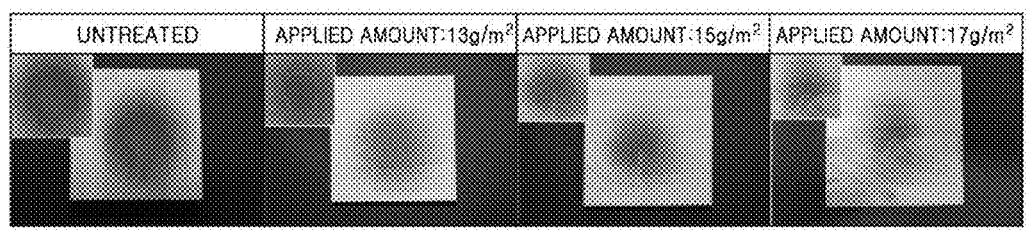
FIG. 18 shows test results of flame retardant performance before and after coating a supercritical dried hydrophobic aerogel according to one embodiment of the present invention.

Table 7 and FIG. 18 correspond to a test conducted to confirm whether flame retardant properties were exhibited by applying heat, in a harsh environment of high temperature, i.e. at a temperature of 550° C. or higher, the nanocomposite surface with superhydrophobic properties which was formed using a supercritical-dried hydrophobic aerogel according to one embodiment of the present invention. It was observed at a predetermined interval and for a predetermined period of time whether the flame retardant properties were exhibited on a nanocomposite prepared by using the hydrophobic aerogel and the inorganic nano-sol on at least one surface of each of various substrates (wood, glass, copper plate, aluminum foil, and PET). A degree of flame retardant performance was measured by detecting the char area (the area carbonized by flame), the char length, and the like. In a flame retardant performance measurement test, a distance to the flame was fixed to 20 cm and the measurements were conducted for varying lengths of time. In addition, the thickness of the nanocomposite on the wood substrate used in the present experiment was 10 to 100 μm and the applied amount of the nanocomposite was 13 g/m² to 17 g/m².

FIG. 18 shows results of the flame retardant performance test before and after coating the wood substrate with the supercritical-dried aerogel nanocomposite, and the result values are shown in Table 5 below. It can be understood that the contact angle is improved and the char area and char length are reduced when the supercritical-dried nanocomposite is formed.

Figure 19:
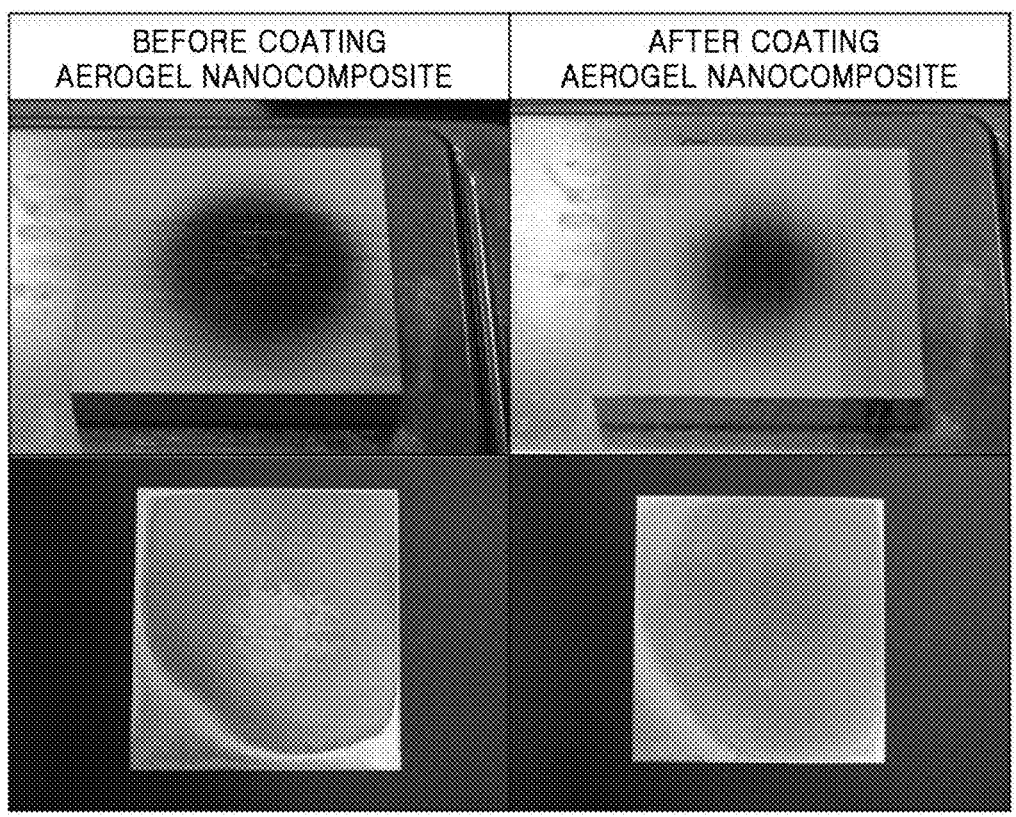
FIG. 19 shows test results of flame retardant properties on a wood substrate and a copper plate substrate on each of which a hydrophobic aerogel nanocomposite surface is formed according to one embodiment of the present invention.

FIG. 19 shows results of testing the flame retardant properties by forming, on a wood substrate and a copper plate substrate, a superhydrophobic coating film prepared using the supercritical-dried hydrophobic aerogel according to one embodiment of the present invention. It can be seen that, in comparison with existing wood, the flame retardant properties are exhibited and the char area is reduced.

TABLE 7

| Applied Amount | Untreated | 13 g/m² | 15 g/m² | 17 g/m² |
| --- | --- | --- | --- | --- |
| Contact angle (°) before flame retardant test | 20 | 146 | 146 | 147 |
| Contact angle (°) after flame retardant test | 71 | 143 | 143 | 144 |
| Char length (width, height, mm) | 42, 43 | 28, 34 | 33, 27 | 26, 22 |
| Char area (mm²) | 1955 | 787 | 677 | 233 |

Experimental Example 9

A nanocomposite was applied on one surface of each of various substrates (wood, glass, copper plate, aluminum foil, and PET) by using a hydrophobic aerogel and an inorganic nano-sol, and a harsh environment of extreme low temperature was formed to determine whether anti-icing properties were exhibited. After a slight inclination was given to the surface before and after coated with the aerogel nanocomposite, an anti-icing test was carried out by pouring to water in a supercooled state.

Figure 20:
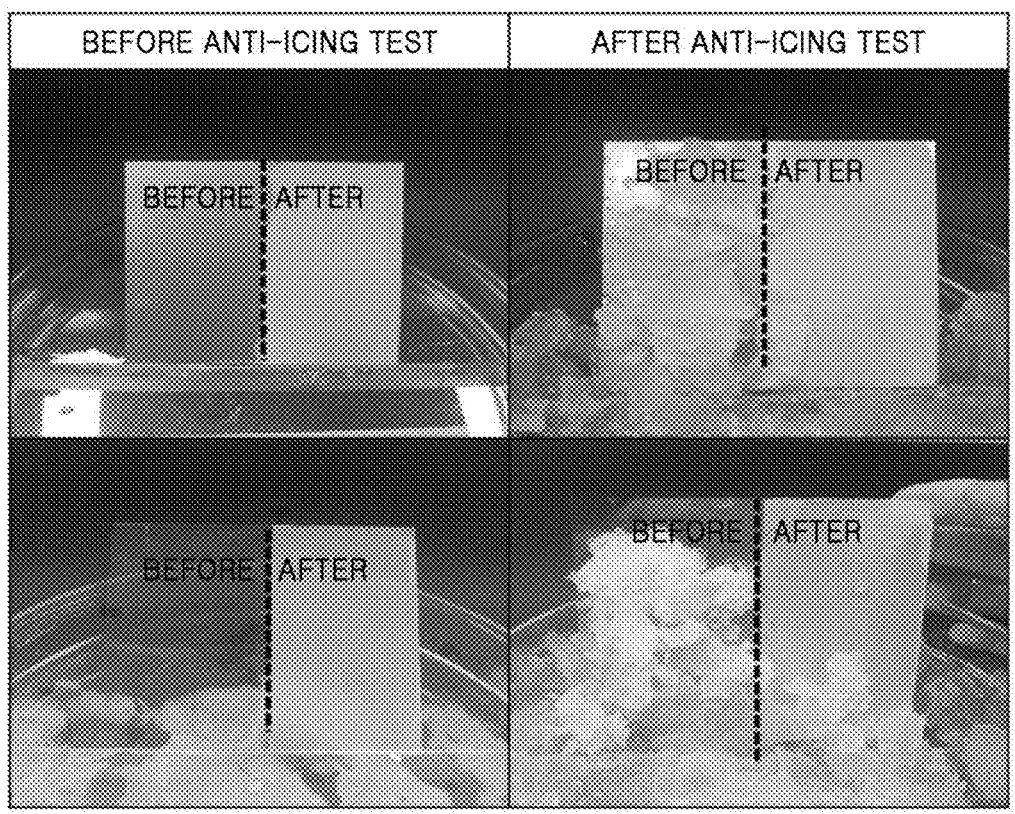
FIG. 20 shows results of an anti-icing test on a copper plate substrate and a glass substrate on each of which a hydrophobic aerogel nanocomposite surface is formed according to one embodiment of the present invention.

FIG. 20 shows results of an anti-icing test by forming a superhydrophobic coating film, prepared using the supercritical-dried hydrophobic aerogel according to one embodiment of the present invention, on only a half of the surface of each of a copper plate substrate and a glass substrate. The substrate on which the nanocomposite was formed exhibited anti-icing characteristics due to the water-repellent properties of the aerogel nanocomposite in which water flows down even at low inclination angles without forming water droplets. It is observed that the water in a supercooled state immediately flows down on the surface coated with the nanocomposite whereas ice is left on the opposite surface which is not coated with the aerogel nanocomposite. Due to the characteristics of the nanocomposite having a low surface energy, it is possible to produce a surface having freezing inhibition and frost durability. With such properties, the superhydrophobic coating film according to an embodiment of the present invention may be used for a problem (load on a transmission line) caused by freezing.

According to the method of producing a superhydrophobic coating film in which the aerogel nanocomposites formed as described above are arranged, it is possible to apply the coating film to various substrates and to easily use in an external environment due to improved adhesion, water repellency persistency, and duration. In addition, the production cost is relatively inexpensive and the application to a large area with an easy method is possible, as compared to a prior art. It will be understood that the scope of the present invention is not limited to the above-described effects.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. A method of producing a superhydrophobic coating film, the method comprising the steps of:
    (a) preparing a hydrophobic aerogel;
    (b) preparing a water-repellent solution by mixing the hydrophobic aerogel in a hydrophobic inorganic nano-sol;
    (c) applying the water-repellent solution on at least one surface of a substrate, wherein the step (c) comprises;
    (c1) forming a primer layer by applying a hydrophobic inorganic nano-sol on at least one surface of the substrate; and
    (c2) applying the water-repellent solution on the primer layer; and
    (d) drying the substrate.

2. The method of claim 1, wherein the step (a) comprises:
    (a1) performing surface treatment to modify a surface of a hydrophilic wet gel; and
    (a2) drying the surface-modified wet gel under atmospheric pressure to provide the hydrophobic aerogel.

3. The method of claim 2, wherein the performing surface treatment includes at least one surface treating agent selected from the group consisting of a silane group compound, a siloxane group compound, a silanol group compound, and a silazane group compound.

4. The method of claim 2, wherein the content of the hydrophobic aerogel ranges from 3 wt % to 17.5 wt %.

5. The method of claim 2, wherein the content of the hydrophobic aerogel ranges from 7.5 wt % to 17.5 wt %.

6. The method of claim 1, wherein the step (a) includes a step of drying the hydrophilic aerogel using a supercritical fluid.

7. The method of claim 6, wherein the content of the hydrophobic aerogel ranges from 7.5 wt % to 17.5 wt %.

8. The method of claim 1, wherein the step (c) is performed using one or more methods out of brush coating, spin coating, spray coating, and dip coating.

9. The method of claim 1, wherein the hydrophobic inorganic nano-sol is a silica sol or a silica-hybrid sol.

10. The method of claim 1, wherein the hydrophobic inorganic nano-sol includes one or more of methyltrimethoxysilane, methyltrichlorosilane, ethyltrimethoxysilane, ethyltriethoxysilane, phenyltrimethoxysilane), phenyltrichlorosilane, phenylaminopropyltrimethoxysilane, octyltrimethoxysilane, octyltrichlorosilane, octadecyltrimethoxysilane, octadecyltrichlorosilane, propyltrimethoxysilane, n-propyltriethoxysilane, isopropyltriethoxysilane, isobutyltrimethoxysilane, vinyltriethyloxy silane, vinyltrimethoxysilane, or allyltrimethoxysilane.

11. The method of claim 1, wherein the substrate is made of wood, glass, aluminum foil, copper plate, or polyethylene terephthalate (PET).

12. The method of claim 1, further comprising, before the step (c), a step of pretreating the substrate.

13. The method of claim 1, wherein the step (d) is performed in a temperature range of 20 to 150° C.

14. The method of claim 1, further comprising, after the step (d), a step of removing particles that are not fixed to the surface of the substrate.

15. The method of claim 1, wherein a specific surface area of the hydrophobic aerogel ranges from 100 $m^2/g$ to 1200 $m^2/g$.

16. The method of claim 1, wherein the superhydrophobic coating film has a contact angle in a range from 100° to 160°.

17. The method of claim 16, wherein the contact angle of the superhydrophobic coating film remains in the range from 100° to 160° after being heated by flame at a temperature of 550°C. or higher.

18. The method of claim 1, wherein the superhydrophobic coating film has a thickness in a range from 1 μm to 100 μm.

19. The method of claim 1, wherein the superhydrophobic coating film has a contact angle in a range from 132° to 160°.

20. The method of claim 19, wherein the superhydrophobic coating film has a pencil hardness in a range from 3B to 9B.

* * * * *